US010560884B2

(12) United States Patent
Chau et al.

(10) Patent No.: US 10,560,884 B2
(45) Date of Patent: Feb. 11, 2020

(54) METHODS AND SYSTEMS FOR SELECTING SIM CARD

(71) Applicant: Pismo Labs Technology Limited, Kowloon (HK)

(72) Inventors: Kit Wai Chau, Hong Kong (HK); Ho Ming Chan, Hong Kong (HK); Man Kit Kwan, Hong Kong (HK)

(73) Assignee: Pismo Labs Technology Limited, Kowloon (HK)

( * ) Notice: Subject to any disclaimer, the term of this patent is extended or adjusted under 35 U.S.C. 154(b) by 0 days.

(21) Appl. No.: 16/102,665

(22) Filed: Aug. 13, 2018

(65) Prior Publication Data
US 2018/0352496 A1 Dec. 6, 2018

Related U.S. Application Data

(63) Continuation of application No. 15/118,890, filed as application No. PCT/IB2015/059920 on Dec. 23, 2015, now Pat. No. 10,051,544.

(51) Int. Cl.
*H04W 36/34* (2009.01)
*H04W 88/06* (2009.01)
(Continued)

(52) U.S. Cl.
CPC .............. *H04W 36/34* (2013.01); *H04L 1/18* (2013.01); *H04L 47/34* (2013.01); *H04W 8/183* (2013.01);
(Continued)

(58) Field of Classification Search
CPC ......... H04W 48/18; H04W 4/02; H04W 8/18; H04W 4/24; H04W 12/06; H04W 60/005;
(Continued)

(56) References Cited

U.S. PATENT DOCUMENTS

2014/0274006 A1* 9/2014 Mutya .................. H04W 36/14
455/416
2015/0092611 A1 4/2015 Ponukumati
(Continued)

FOREIGN PATENT DOCUMENTS

| CN | 101222723 A | 7/2008 |
| CN | 104853340 A | 8/2015 |
| CN | 104980905 A | 10/2015 |

OTHER PUBLICATIONS

International Search Report of International Application No. PCT/IB2015/059920, dated Jul. 26, 2016. (3 pages).
(Continued)

*Primary Examiner* — Kwasi Karikari
(74) *Attorney, Agent, or Firm* — FisherBroyles, LLP

(57) ABSTRACT

The present invention discloses methods and systems for selecting at least one SIM card for data communication at a wireless communication device which is capable of housing a plurality of SIM cards. When a switching condition is satisfied, the wireless communication device selects a second SIM card group, and disconnects one or more connections established using any non-second group SIM card. Non-second group SIM cards are SIM cards that are not in the second SIM card group. A selected SIM card from the second SIM card group is then used for data communications. The steps are repeated until (i) the switching condition is no longer satisfied, (ii) no more SIM cards selected from the second SIM card group can be used for data communications or (iii) no more connection is made using non-second group SIM cards.

20 Claims, 13 Drawing Sheets

(51) Int. Cl.
  *H04W 48/18* (2009.01)
  *H04L 1/18* (2006.01)
  *H04L 12/801* (2013.01)
  *H04W 8/18* (2009.01)
  *H04M 1/725* (2006.01)

(52) U.S. Cl.
  CPC .......... *H04W 48/18* (2013.01); *H04W 88/06* (2013.01); *H04M 1/72519* (2013.01); *H04M 2250/66* (2013.01)

(58) Field of Classification Search
  CPC ....... H04W 60/06; H04W 8/245; H04W 4/60; H04W 76/15; H04W 36/34; H04W 4/70; H04W 72/087; H04W 8/02; H04W 76/01
  See application file for complete search history.

(56) References Cited

U.S. PATENT DOCUMENTS

| | | |
|---|---|---|
| 2015/0189496 A1 | 7/2015 | Park et al. |
| 2016/0014579 A1* | 1/2016 | Kasilya Sudarsan ... H04W 4/16 455/417 |
| 2016/0323933 A1 | 11/2016 | Song |
| 2016/0374014 A1* | 12/2016 | Anyuru ............... H04L 63/0853 |

OTHER PUBLICATIONS

Written Opinion of the International Searching Authority of International Application No. PCT/IB2015/059920, dated Jul. 26, 2016. (3 pages).
International Preliminary Report on Patentability Chapter I of International Application No. PCT/IB2015/059920, dated Jun. 26, 2018. (4 pages).

* cited by examiner

| SIM card | Allowed MCC |
|---|---|
| 111a | 208 |
| 112a | 460 |
| 113a | 208, 234 |
| 114a | 234 |

Fig. 6A

METHODS AND SYSTEMS FOR SELECTING SIM CARD

RELATED APPLICATIONS

This application is a Continuation of U.S. application Ser. No. 15/118,890, titled "METHODS AND SYSTEMS FOR SELECTING SIM CARD" filed 14 Aug. 2016, which is a National Stage entry of, and claims benefit to, PCT application No. PCT/IB2015/059920, titled "METHODS AND SYSTEMS FOR SELECTING SIM CARD" filed 23 Dec. 2015, each of which are incorporated herein by reference in their entireties.

TECHNICAL FIELD

The present invention relates in general to the field of computer networks. More particularly, the present invention relates to methods and systems for selecting at least one SIM card for data communication at a wireless communication device which is capable of housing a plurality of SIM cards.

BACKGROUND ART

A wireless communication device, such as a router or gateway may be used in various deployments according to preferences of a user or administrator. Therefore, at different times, network environment may be different. When network environment changes, there may be disruptions in Internet connectivity. Prior art fails to disclose methods for seamlessly changing connections according to changes in network environment. Therefore, solution is required for ensuring that the wireless communication device is connected to the Internet without disruptions. Furthermore, for example, when there is a change in geographical location, a user or administrator has to manually configure the wireless communication device to use a SIM card that belongs to that particular geographical location. When there are many devices and SIM cards, it is a hassle to configure each device manually. A solution is required for automatically selecting SIM cards according to geographical location.

DISCLOSURE OF INVENTION

Summary of Invention

The present invention discloses methods and systems for selecting at least one SIM card at a wireless communication device. The wireless communication device is capable of housing a plurality of SIM cards. The method comprises determining whether a switching condition is satisfied. When the switching condition is satisfied, the wireless communication device selects a second SIM card group and disconnects a connection established using a non-second group SIM card. Non-second group SIM cards are SIM cards not in the second SIM card group. The SIM card selected from the second SIM card group is then used for data communications. The above method is repeated until the switching condition is no longer satisfied, or no more SIM cards selected from the second SIM card group can be used for data communications, or no more connection is made using non-second group SIM cards. The wireless communication device is capable of simultaneously using at least one SIM card from the second SIM card group and at least one non-second group SIM card to establish a plurality of connections.

According to one of the embodiments of the present invention, the switching condition is selected from a group consisting of performance, maximizing the number of networks, service provider, usage limit, geographical location, time, user identity, and communication technology. The geographical location can be determined based on signal strength of networks or network identity. The geographical location can also be determined using global positioning system (GPS) sensor.

According to one of the embodiments of the present invention, SIM cards are classified according to a grouping policy. The grouping policy is selected from a group consisting of geographical coverage area, connection bandwidth, time, usage price, usage limit, and signal quality. According to one of the embodiments, the grouping policy for the second SIM card group is a second geographical area, such that SIM cards associated with networks in the second geographical area are grouped into the second SIM card group. The switching condition is satisfied when the wireless communication device moves from a geographical coverage area associated with non-second group SIM card to the second geographical coverage area.

According to one of the embodiments of the present invention, the wireless communication device comprises a plurality of wireless modems, and the plurality of SIM cards connect to available networks using the plurality of wireless modems. At least one wireless modem is used for monitoring signal strength of remaining available networks.

According to one of the embodiments of the present invention, the plurality of SIM cards establish a plurality of end-to-end connections. The plurality of end-to-end connections are bonded to form an aggregated end-to-end connection.

According to one of the embodiments of the present invention, when the switching condition is to maximize the number of networks connected, and whenever the wireless communication device is capable of connecting to a new network, the wireless communication device connects to the new network. This is done in order to maximize the number of networks connected.

According to one of the embodiments of the present invention, the SIM card selected from the second SIM card group is capable of using roaming service. The SIM card connects to a network using roaming service only when the SIM card cannot connect to any other network not using roaming service.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. An wireless access network may be implemented using infra-red, High-Speed Packet Access (HSPA), HSPA+, Long Term Evolution (LTE), WiMax, General packet radio service (GPRS), Global System for Mobile Communications (GSM), Enhanced Data rates for GSM Evolution (EDGE), Code division multiple access (CDMA), WiFi, CDMA2000, Wideband CDMA (WCDMA), Time Division CDMA (TD-SCDMA), BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, metropolitan area network (MAN), wide area network (WAN), the public switched telephone network (PSTN), a satellite communication system, a cable transmission system, and/or the like.

FIG. 1A is a block diagram illustrating the system of a wireless communications device 100. Wireless communications device 100 comprises a plurality of wireless modems 101, 102, 103 and 104 and a plurality of SIM card slots. The plurality of SIM card slots are used for housing SIM cards 111a, 111b, 112a, 112b, 113a, 113b, 114a and 114b. In one example, any four SIM cards from SIM cards 111a-114b can be used for connecting to networks associated with the SIM cards through the four wireless modems 101-104 respectively. The user or administrator of wireless communications device 100 may or may not insert SIM cards in all of the plurality of SIM card slots. Wireless communication device 100 also comprises a plurality of network interfaces such as local area network (LAN) interfaces 121 and 122, and wide area network (WAN) interfaces 123 and 124. LAN interfaces 121 and 122 may be wired or wireless LAN interfaces through which hosts can connect to wireless communication device 100. The number of wireless modems is not limited to four, such that there could be one or more wireless modems.

In one variant, wireless communication device 100 comprises a USB interface for housing a USB modem, and the USB modem is used for Internet connectivity instead of or in conjunction with the SIM cards. For illustration purposes, the USB modem is a 4G LTE USB modem. In another variant, one or more of the plurality of SIM card slots are connected to wireless communication device 100 through a USB interface. More precisely, a USB modem comprising a SIM card slot is inserted in a USB interface of wireless communication device 100. Wireless communication device 100 is be able to use a SIM card inserted in the SIM card slot of the USB modem for connecting to a network.

In one of the embodiments of the present invention, each wireless modem is capable of using a plurality of SIM cards, one at a time. For example, SIM cards 111a and 111b are associated with wireless modem 101; SIM cards 112a and 112b are associated with wireless modem 102; SIM cards 113a and 113b are associated with wireless modem 103; and SIM cards 114a and 114b are associated with wireless modem 104. Therefore, when SIM card 112a is selected to be used, connection with a cellular service provider is established through wireless modem 102 and SIM card 112b cannot be used. Those who are skilled in the art would also appreciate that the SIM card 112a can also be considered as attached to the cellular service provider. However, even though a plurality of SIM cards are associated with each wireless modem, at a given time, only one SIM card can be used by a wireless modem, and one wireless modem can be used to communicate using one SIM card only.

FIG. 1B is a block diagram illustrating the architecture of wireless communication device 100, according to one of the embodiments of the present invention. Wireless communication device 100 comprises processing unit 130, main memory 131, secondary storage 132, system bus 133, network interfaces 134, wireless modems 135, and SIM cards 136. Network interfaces 134 comprises LAN interfaces 121, 122, and WAN interfaces 123 and 124. Wireless modems 135 comprises wireless modems 101-104. SIM cards 136 comprises SIM cards 111a-114b. Processing unit 130 and main memory 131 are connected to each other directly. System bus 133 connects processing unit 130 directly or indirectly to secondary storage 132, network interfaces 134, wireless modems 135, and SIM cards 136. Using system bus 133 allows wireless communication device 100 to have increased modularity. System bus 133 couples processing unit 130 to secondary storage 132, network interfaces 134, wireless modems 135, and SIM cards 136. System bus 133 can be any of several types of bus structures including a memory bus, a peripheral bus, and a local bus using any of a variety of bus architectures. Secondary storage 132 stores program instructions for execution by processing unit 130. The methods described in the embodiments below are processes carried out by processing unit 130.

FIG. 1C is a block diagram illustrating the architecture of wireless communication device 100, according to one of the embodiments of the present invention. In this embodiment, wireless modems are capable of connecting to SIM cards through selectors. Wireless modem 101 is capable of connecting to SIM cards 111a or 111b through selector 137; wireless modem 102 is capable of connecting to SIM cards 112a or 112b through selector 138; wireless modem 103 is capable of connecting to SIM cards 113a or 113b through selector 139; wireless modem 104 is capable of connecting to SIM cards 114a or 114b through selector 140. Selector 137 allows wireless modem 101 to use either SIM card 111a or 111b by using a multiplexing technique. Similarly, selector 138 allows wireless modem 102 to use either SIM card 112a or 112b; selector 139 allows wireless modem 103 to use either SIM card 113a or 113b; and selector 140 allows wireless modem 104 to use either SIM card 114a or 114b.

Selectors 137, 138, 139 and 140 are connected to processing unit 130 through system bus 133, and processing unit 130 sends logical inputs to selectors 137, 138, 139 and 140 so that a SIM card can be selected for wireless modems 101, 102, 103, and 104 respectively. For example, when processing unit 130 sends a logical input to selector 137 for selecting SIM card 111a, wireless modem 101 uses SIM card 111a and connects to a network associated with SIM card 111a. Wireless modem 101 therefore does not use SIM card 111b.

FIG. 1D is a block diagram illustrating the architecture of wireless communication device 100 according to one of the embodiments of the present invention. In this embodiment, one selector can be used for a plurality of wireless modems. Selector 141 is directly connected to processing unit 130. Processing unit 130 sends logical inputs to selector 141 in order to select SIM cards to be used by wireless modems 101 and 102. Wireless modems 101, 102, 103 and 104 are all connected to selector 141. At a given time, wireless modem 101 is capable of connecting to only one of SIM cards 111a, 111b, 112a, 112b, 113a, 113b, 114a, and 114b. Similarly, at a given time, wireless modem 102 is capable of connecting to only one of SIM cards 111a, 111b, 112a, 112b, 113a, 113b, 114a, and 114b. Wireless modem 101, 102, 103, and 104 cannot use the same SIM card simultaneously. For example, processing unit 130 sends four logical inputs to selector 141, i.e. a first logical input for selecting a SIM card for wireless modem 101, a second logical input for selecting a SIM card for wireless modem 102, a third logical input for selecting a SIM card for wireless modem 103, and a fourth logical input for selecting a SIM card for wireless modem 104. For illustration purpose, when the first logical input sent to selector 141 is to select SIM card 112a, then wireless modem 101 uses SIM card 112a and connects to a network associated with SIM card 112a. When the second logical input sent to selector 141 is to select SIM card 111b, then wireless modem 102 uses SIM card 111b and connects to a network associated with SIM card 111b. When the third logical input sent to selector 141 is to select SIM card 113b, then wireless modem 103 uses SIM card 113b and connects to a network associated with SIM card 113b. When the fourth logical input sent to selector 141 is to select SIM card 113a, then wireless modem 104 uses SIM card 113a and connects to a network associated with SIM card 113a.

Examples of a selector for two SIM cards, such as selectors 137 and 138, include TXS02326 Dual-Supply 2:1 SIM Card Multiplexer/Translator supplied by Texas Instruments and LTC4557 Dual SIM/Smart Card Power Supply and Interface supplied by Linear Technology.

In one variant, a wireless modem is only capable of using one SIM card. For example, wireless modem 101 is only capable of using SIM card 111a. In this case, there may not be a selector for connecting wireless modem 101 and SIM card 111a, such that wireless modem 101 is connected to SIM card 111a directly.

FIG. 2 is a flowchart illustrating a process according to one of the embodiments of the present invention. FIG. 2 is viewed in conjunction with FIG. 1A for better understanding of the embodiments. FIG. 1A is a generalized block diagram of wireless communication device 100, and FIG. 1B, FIG. 1C and FIG. 1D are more specific and detailed examples of the architecture wireless device 100. Therefore, the process of FIG. 2 is also applicable to FIG. 1B, FIG. 1C and FIG. 1D. Wireless communication device 100 establishes a first, second, third, and fourth connection with a first network through wireless modems 101, 102, 103, and 104 respectively. SIM cards 111a, 112a, 113a and 114a are associated with the first network. SIM cards 111b, 112b, 113b and 114b are associated with a second network. For illustration purposes, SIM cards 111a, 112a, 113a and 114a are comprised in a first SIM card group. SIM cards 111b, 112b, 113b and 114b are comprised in a second SIM card group. Classification of the plurality of SIM cards into a first and second SIM card group is discussed in greater detail later in the specification. In step 201, wireless communication device 100 monitors whether a switching condition is satisfied. The switching conditions are discussed in greater detail below. In one variant, the switching condition is based on performance or other factors related to the first, second, third and fourth connections. For example, wireless communication device 100 monitors the signal quality, the bandwidth usage, latency, and/or other values for determining connection performance. In another variant, wireless communication device 100 monitors its location instead of network performance in step 201. For example, location can be monitored using a global positioning system (GPS) sensor. In step 202, wireless communication device 100 determines whether a switching condition has been satisfied by any of the connections. If a switching condition is satisfied, wireless communication device 100 switches connection from the first SIM card group to the second SIM card group one by one in step 203. After the switching is complete, wireless communication device 100 will then have established a fifth, sixth, seventh, and eighth connection with the second network for data communication. If the switching condition is not satisfied, wireless communication device 100 continues using the first SIM card group for data communication.

It should be noted that each SIM card group, i.e., the first and second SIM card group, may comprise one or more SIM cards. The scope of the invention is not limited to the first SIM card group comprising four SIM cards and the second SIM card group comprising four SIM cards.

According to one of the embodiments, the switching condition in step 202 is selected from a group consisting of performance, maximizing the number of networks, service provider, usage limit, geographical location, time, user identity, and communication technology. The performance switching condition can be based on one or more of throughput, error rates, packet latency, packet jitter, symbol jitter, quality of service, bandwidth, bit error rate, packet error rate, frame error rate, dropped packet rate, queuing delay, round trip time, capacity, signal level, interference level, bandwidth delay product, handoff delay time, signal-to-interface ratio, and signal-to-noise ratio. In one variant, these switching conditions may also be used for grouping policies, i.e. for classifying SIM cards into a first SIM card group and a second SIM card group.

In one example, viewing in conjunction with FIG. 1C, SIM cards 111a, 112a, 113a, and 114a are in a first SIM card group, and SIM cards 111b, 112b, 113b and 114b are in a second SIM card group. SIM cards 111a, 112a, 113a, and 114a are associated with a first network and SIM cards 111b, 112b, 113b and 114b are associated with a second network. As wireless modem 101, 102, 103, and 104 is only capable of using one of SIM cards 111a-111b, 112a-112b, 113a-113b and 114a-114b respectively at a given time, SIM cards 111a, 112a, 113a, and 114b are in the first SIM card group and SIM cards 111b, 112b, 113b and 114b are in the second SIM card group. When a switching condition is satisfied in step 202, connection is switched from the first SIM card group to the second SIM card group in step 203. Wireless communication device 100 then connects to the second network through wireless modem 101 using SIM card 111b, through wireless modem 102 using SIM card 112b, through wireless modem 103 using SIM card 113b, and through wireless modem 104 using SIM card 114b.

In another example, viewing in conjunction with FIG. 1D, SIM cards 111a, 111b, and 112a are in a first SIM card group, SIM cards 112b, 113a, 113b are in a second SIM card group, and SIM cards 114a and 114b are in a third SIM card group. SIM cards 112b, 113a and 113b are associated with a second network. SIM cards 111a-114b can be used by any of wireless modems 101-104. Wireless communication device 100 may initially be connected to networks associated with the first or third SIM card group. When a switching condition is satisfied in step 202, connection is switched to the second SIM card group in step 203. For illustration purpose, wireless communication device 100 then connects to the second network through wireless modem 101 using SIM card 112b, through wireless modem 102 using SIM card 113a, and through wireless modem 103 using SIM card 113b. The scope of the invention is not limited to switching from the first SIM card group to the second SIM card group, such that connection can be switched from other SIM card groups to the second SIM card group. Therefore, in step 203, connection can be switched from the first SIM card group to the second SIM card group, or connection can also be switched from the third SIM card group to the second SIM card group.

Maximizing the Number of Networks:

According to one of the embodiments of the present invention, the switching condition is to maximize the number of networks connected. The switching condition in step 202 is satisfied when wireless communication device 100 becomes capable of connecting to more networks than it is currently connected to. One of the benefits of maximizing the number of networks is that even if connection to one or more networks fails for some reason, wireless communication device 100 may have Internet connectivity through the other connected networks. Whenever a new network is available, and wireless communication device 100 is capable of connecting to the new network, switching condition is then satisfied in step 202, and wireless communication device 100 connects to the new network in step 203. It should be noted that wireless communication device 100 comprises four wireless modems, and thus can establish four connections using four SIM cards respectively.

This disclosure comprises tables, namely TABLE 0001, TABLE 0002, TABLE 0003, TABLE 0004, TABLE 0005, TABLE 0006 and TABLE 0007. In the following tables, "connected" means that wireless communication device 100 is connected to the network using the corresponding SIM card through the corresponding wireless modem. An empty cell, "- -" means that the corresponding SIM card is not being used to connect to the network, or a SIM card is not being used by any wireless modem for connecting to any network. "Available" means that the SIM card is capable of connecting to the network, i.e., the network is available for connection using the corresponding SIM card, but is not currently connected to. "Not connected" means that the SIM card is not connected to the network. In TABLE 0006, "Associated" means that the SIM card is associated with the service provider, i.e., the service provider provides services of the SIM card. "Not Associated" means that the SIM card is not associated with the service provider.

For illustration purpose, in one example, wireless modem 101 and wireless modem 102 are using SIM card 111a and 112a respectively to connect to a first network, and wireless modem 103 uses SIM card 113a to connect to a second network. Therefore, wireless communication device 100 is initially connected to two networks by using three SIM cards. Table 0001 illustrates initial connections using each SIM card.

TABLE 0001

|  | Wireless modem | First Network | Second Network | Third Network |
|---|---|---|---|---|
| SIM card 111a | 101 | Connected | — | — |
| SIM card 111b | — | — | — | — |
| SIM card 112a | 102 | Connected | — | Available |
| SIM card 112b | — | — | — | — |
| SIM card 113a | 103 | — | Connected | — |
| SIM card 113b | — | — | — | — |
| SIM card 114a | — | — | — | Available |
| SIM card 114b | — | — | — | — |

Then, when a new network, such as a third network, is available for connection using SIM cards 114a and 112a, wireless communication device 100 connects to the third network using at least one of SIM cards 114a and 112a in step 203. Since wireless modem 104 is not being used, wireless communication device 100 connects to the new network using wireless modem 104 without disconnecting any connection to current networks. In one example of this embodiment, viewing in conjunction with FIG. 1C, wireless modem 104 is capable of using SIM card 114a or 114b. Therefore, wireless modem 104 uses SIM card 114a to connect to the third network. SIM card 112a is not used by wireless modem 104 because wireless modem 104 is not capable of using SIM card 112a, as illustrated in FIG. 1C. Wireless communication device 100 is then connected to three networks: the first network through wireless modem 101 using SIM cards 111a and 112a, the second network through wireless modem 103 using SIM card 113a, and the third network through wireless modem 104 using SIM card 114a. Table 0002 illustrates connections of SIM cards after step 203 has been performed in this example.

TABLE 0002

| FIG. 1C | Wireless modem | First Network | Second Network | Third Network |
|---|---|---|---|---|
| SIM card 111a | 101 | Connected | — | — |
| SIM card 111b | — | — | — | — |
| SIM card 112a | 102 | Connected | — | Available |
| SIM card 112b | — | — | — | — |
| SIM card 113a | 103 | — | Connected | — |
| SIM card 113b | — | — | — | — |
| SIM card 114a | 104 | — | — | Connected |
| SIM card 114b | — | — | — | — |

In one variant, a new network is available for connection only by using one particular SIM card. For illustration purpose, and continuing with the same example, the third network is available for connection using SIM card 112b only. Viewing in conjunction with FIG. 1D, only wireless modem 102 is capable of using SIM card 112b. In order to connect to the third network, wireless modem 102 stops using SIM card 112a to connect to the first network, and start using SIM card 112b to connect to the third network. Since wireless communication device 100 has already connected to the first network using SIM card 111a as well, wireless communication device 100 is still connected to the first network even after wireless modem 102 has stopped using SIM card 112a to connect to the first network. Wireless modem 102 can then use SIM card 112b to connect to the third network. Wireless communication device 100 is then connected to three networks: the first network through wireless modem 101 using SIM card 111a, the second network through wireless modem 103 using SIM card 113a, and the third network through wireless modem 102 using SIM card 112b. For illustration purpose, if a fourth network is available and can be connected by using SIM card 114a, wireless modem 104 will then use SIM card 114a to connect to the fourth network in order to maximize the number of networks connected. Wireless communication device 100 is then connected to four networks: the first network through wireless modem 101 using SIM card 111a, the second network through wireless modem 103 using SIM card 113a, the third network through wireless modem 102 using SIM card 112b, and the fourth network through wireless modem 104 using SIM card 114a. Table 0003 illustrates connections of SIM cards after wireless communication device 100 connects to the fourth network.

TABLE 0003

| FIG. 1C | Wireless modem | First Network | Second Network | Third Network | Fourth Network |
|---|---|---|---|---|---|
| SIM card 111a | 101 | Connected | — | — | — |
| SIM card 111b | — | — | — | — | — |
| SIM card 112a | — | Not connected | — | — | — |
| SIM card 112b | 102 | — | — | Connected | — |
| SIM card 113a | 103 | — | Connected | — | — |
| SIM card 113b | — | — | — | — | — |
| SIM card 114a | 104 | — | — | — | CConnected |
| SIM card 114b | — | — | — | — | — |

In another example of this embodiment, viewing in conjunction with FIG. 1D, wireless modems 101-104 are capable of using any of SIM cards 111a-114b. For illustration purpose, the third network is available for connection using SIM card 113b only. Since wireless modem 104 is not being used initially, wireless communication device 100 connects to the third network using wireless modem 104 without disconnecting any connection to current networks. Therefore, wireless modem 104 uses SIM card 113b to connect to the third network. Wireless communication device 100 is then connected to three networks: the first network through wireless modem 101 and wireless modem 102 using SIM card 111a and 112a respectively, the second network through wireless modem 103 using SIM card 113a, and the third network through wireless modem 104 using SIM card 113b. Table 0004 illustrates connections of SIM cards in this example.

TABLE 0004

| FIG. 1D | Wireless modem | First Network | Second Network | Third Network |
|---|---|---|---|---|
| SIM card 111a | 101 | Connected | — | — |
| SIM card 111b | — | — | — | — |
| SIM card 112a | 102 | Connected | — | — |
| SIM card 112b | — | — | — | — |
| SIM card 113a | 103 | — | Connected | — |
| SIM card 113b | 104 | — | — | Connected |
| SIM card 114a | — | — | — | — |
| SIM card 114b | — | — | — | — |

In another example of this embodiment, initially wireless modem 101 and wireless modem 102 uses SIM card 111a and 112a respectively to connect to a first network; wireless modem 103 uses SIM card 113a to connect to a second network; wireless modem 104 uses SIM card 113b to connect to a third network, as illustrated in Table 0004. Therefore, wireless communication device 100 is connected to three networks initially. Viewing in conjunction with FIG. 1D, wireless modems 101-104 are capable of using any of SIM cards 111a-114b. Since all four wireless modems 101-104 are in use, connection of at least one wireless modem to a current network needs to be disconnected first before connecting to a new network. When a fourth network is available for connection through a SIM card, such as SIM card 114a, wireless communication device 100 connects to the fourth network using at least one SIM card in step 203. As wireless communication device 100 has been connected to the first network using two SIM cards, connection of one of the wireless modems connecting to the first network is disconnected in order to allow a wireless modem to become available for connecting to a fourth network. Connection of wireless modem 102 to the first network is disconnected. Therefore, wireless modem 102 stops using SIM card 112a, and starts using SIM card 114a to connect to the fourth network. Wireless communication device 100 is then connected to four networks: the first network through wireless modem 101 using SIM card 111a, the second network through wireless modem 103 using SIM card 113a, the third network through wireless modem 104 using SIM card 113b, and the fourth network through wireless modem 102 using SIM card 114a. In this way, number of networks is maximized. Table 0005 illustrates connections of SIM cards in this example.

TABLE 0005

| FIG. 1D | Wireless modem | First Network | Second Network | Third Network | Fourth Network |
|---|---|---|---|---|---|
| SIM card 111a | 101 | Connected | — | — | — |
| SIM card 111b | — | — | — | — | — |
| SIM card 112a | — | Not connected | — | — | — |
| SIM card 112b | — | — | — | — | — |
| SIM card 113a | 103 | — | Connected | — | — |
| SIM card 113b | 104 | — | — | Connected | — |
| SIM card 114a | 102 | — | — | — | CConnected |
| SIM card 114b | — | — | — | — | — |

Service Provider:

In one of the embodiments, a switching condition is based on, at least in part, the service provider of the SIM cards. A switching condition is to connect to a service provider, such as service provider B as much as possible. The SIM cards are classified into groups according to service providers, such that a SIM card provided by another service provider, such as service provider A is in a first SIM card group, and a SIM card provided by service provider B is in a second SIM card group. For example, it is found that service provider B provides more reliable service than service provider A provides. Therefore, switching condition is satisfied in step 202 whenever wireless communication device 100 is capable of connecting to networks of service provider B. Therefore connection is switched from the first SIM card group to the second SIM card group in step 203 when wireless communication device 100 is capable of connecting to service provider B.

In one example of this embodiment, viewing in conjunction with FIG. 1D, wireless modems 101-104 are capable of using any of SIM cards 111a-114b for data communication.

Therefore, any of the wireless modems 101-104 can use the SIM cards 111a, 111b, 112a, 112b, 113a and 114a for connecting to service providers A, B, or C. Further, in this example, service providers A, B and C operate in three different geographical areas. There may be overlapping areas where wireless communication device 100 may be capable of connecting to networks of two or more of service providers A, B, and C. Wireless communication device 100 can only use four SIM cards at a time, as there are only four wireless modems. Table 0006 illustrates association of SIM cards with service providers in this example.

TABLE 0006

| | SIM card group | Service Provider A | Service Provider B | Service Provider C |
|---|---|---|---|---|
| SIM card 111a | First | Associated | Not Associated | Not Associated |
| SIM card 111b | Second | Associated | Associated | Not Associated |
| SIM card 112a | Second | Not Associated | Associated | Associated |
| SIM card 112b | Second | Not Associated | Associated | Not Associated |
| SIM card 113a | Third | Not Associated | Not Associated | Associated |
| SIM card 113a | — | — | — | — |
| SIM card 114a | Second | Not Associated | Associated | Not Associated |
| SIM card 114b | — | — | — | — |

SIM cards of the first and third SIM card group can be referred to as non-second group SIM cards. Preference is given to the second SIM card group over non-second group SIM cards, as the second SIM card group is associated with service provider B. Switching condition is satisfied whenever a network associated with service provider B is available. When a network of service provider B is not available, wireless communication device 100 connects to any other available network, such as a network of service provider A or C. When a network of service provider B is available, a switching condition is satisfied in step 202. As service provider B is a preferred service provider SIM card 111b connects to the network of service provider B in step 203, even if networks of service provider A are available. SIM card 112a connects to the network of service provider B in step 203, even if networks of service provider C are available. Wireless communication device 100 switches connection from SIM cards 111a and 113a to 112b and 114a respectively in step 203. More precisely, wireless communication device 100 stops using SIM cards 111a and 113a because they are provided by service provider A and C respectively, and starts using SIM cards 112B and 114a, which are in the second SIM card group, because they are provided by service provider B.

In another example of this embodiment, viewing in conjunction with FIG. 1C, wireless modem 101 is only capable of using SIM cards 111a and 111b, wireless modem 102 is only capable of using SIM cards 112a and 112b, wireless modem 103 is only capable of using SIM cards 113a and 113b, and wireless modem 104 is only capable of using SIM cards 114a and 114b. For illustration purpose, SIM cards 111a, 112a, and 113a are associated with service provider A, and are in a first SIM card group. SIM cards 111b and 112b are associated with service provider B, and are in a second SIM card group. The switching condition is to use service provider B as much as possible. When networks of service provider A are available, and no network of service provider B is available, wireless modems 101, 102 and 103 use SIM cards 111a, 112a and 113a respectively to connect to service provider A. When a network of service provider B becomes available, the switching condition is satisfied in step 202 and step 203 is performed. As SIM cards 111b and 112b are associated with service provider B, wireless communication device uses SIM cards 111b and 112b to connect to service provider B. Wireless modem 101 stops using SIM card 111a, and starts using SIM card 111b to connect to service provider B. Similarly, wireless modem 102 stops using SIM card 112a and starts using SIM card 112b to connect to service provider B. Wireless modem 104 cannot connect to service provider B because it is not capable of using SIM card 111b or 112b.

Usage Limit:

It is common that a service provider charges a lower price per MegaByte (MB) when the usage is below a certain threshold set by the service provider associated with a service plan of a SM card, and when the usage goes above the certain threshold, the price per MB increases. Therefore, by making the usage limit equal to the certain threshold, cost of using the SIM card for Internet connectivity is minimized. In one of the embodiments, a switching condition is based on, at least in part, a usage limit for connection associated with the SIM card. For example, the switching condition is satisfied in step 202 when a usage limit of one or more SIM cards in the first SIM card group has been reached or about to be reached. Wireless communication device 100 then switches from the one or more SIM cards whose usage limit is reached or about to be reached to one or more SIM cards of the second SIM card group in step 203. In one variant, wireless communication device 100 switches from all available SIM cards of the first SIM card group to all available SIM cards of the second SIM card group in step 203. For illustration purpose, a service plan of SIM card 111a is such that the certain threshold is 10 GB, i.e. 10 GB of data can be purchased for a fixed cost, where the price per MB is 1 cent. When the 10 GB of data is used up, the price per MB is increased to 2 cents. Therefore, when SIM card 111a is used for Internet connectivity after exceeding 10 GB of data, usage price of 2 cents is charged for per MB data. In order to reduce cost, usage limit of SIM card 111a is set to 10 GB or a value slightly below 10 GB. When the usage limit has been reached or about to be reached, switching condition is satisfied in step 202 and wireless communication device 100 stops using SIM card 111a and starts using another SIM card from the second SIM card group in step 203 instead of using SIM card 111a. Preferably, wireless communication device 100 starts using a SIM card whose usage limit has not been reached and is not about to be reached yet. In one variant, when a usage limit is about to be reached, a notification is also sent to a user or administrator to inform that the usage limit is about to be reached.

In one of the embodiments, SIM cards can be classified according to a grouping policy based on usage limit and remaining data. Remaining data is the amount of unused data in a service plan associated with a SIM card. For illustration purpose, when a service plan associated with a SIM card is such that the certain threshold is 10 GB, and 4 GB is used up, the remaining data is 6 GB. SIM cards whose usage limit has been reached or is about to be reached are classified into a first SIM card group. SIM cards whose usage limit has not been reached and is not about to be reached are classified into a second SIM card group. When usage limit of a SIM card in the first SIM card group has been reached or about to be reached, switching condition is satisfied in step 202 and wireless communication device 100 stops using the SIM card in the first SIM card group and starts using another SIM card from the second SIM card group for data communications in step 203.

Time:

It is common that there are differences in cost, performance and reliability of connections during peak and off-peak hours. In one of the embodiments, a switching condition is based on, at least in part, the time. For example, at a certain time in the day, it is more preferable to use the second SIM card group than to use the first SIM card group. Therefore, the switching condition is satisfied in step 202 at the certain time, and wireless communication device 100 switches connection from the first SIM card group to the second SIM card group in step 203. It is common that usage price is different at different times of the day or different days of a month or year.

User Identity:

In one of the embodiments, a switching condition is based on, at least in part, the user identity. For example, user authentication is required to configure or access wireless communication device 100 for Internet connectivity. According to the identity of users, certain SIM card connections may be reserved for certain users. The SIM cards are classified into the first and second SIM card groups based on which user group the SIM cards belong to. The first SIM card group can be reserved for a first user group and the second SIM card group can be reserved for a second user group. When a user of the first user group is using wireless communications device 100, first SIM card group is used. When the second user group is using the wireless communications device 100, the switching condition is satisfied in step 202 and connection is switched from the first SIM card group to the second SIM card group in step 203. It is beneficial to have a switching condition based on the user identity when there is more than one user, wherein each user may have different preferences for SIM cards.

In another example of this embodiment, users from only one user group can use wireless communications device 100 at a given time. Therefore, at a given time, wireless communications device 100 only uses either the first SIM card group or the second SIM card group.

In another example of this embodiment, users from both the first and second user groups can use wireless communication device 100 at the same time. In one variant, as wireless communication device 100 has a plurality of LAN interfaces, each LAN interface can be assigned to a specific user group. For example, LAN interface 121 and a first wireless LAN (WLAN) interface is assigned to the first user group, and LAN interface 122 and a second WLAN interface is assigned to the second user group. The first and second WLAN interfaces may utilize Wi-Fi technology to provide internet connectivity to users. In one variant, there are different service set identifiers (SSIDs) for each user group, and each user group connects to networks of different SIM cards using the different SSIDs. For example, users from a first user group connects to wireless communications device 100 through LAN interface 121 and/or the first WLAN interface using a first SSID. Users from a second user group connects to wireless communications device 100 through LAN interface 122 and/or the second WLAN interface using a second SSID. Data associated with the first user group is transmitted and received using SIM cards of the first SIM card group, and data associated with the second user group is transmitted and received using SIM cards of the second SIM card group.

Communication Technology:

one of the embodiments, a switching condition is based on, at least in part, the communication technology. Communication technologies include wireless technologies, Wi-Fi, WiMax, High-Speed Packet Access technology, 3GPP Long Term Evolution (LTE), 4G LTE, or the like. It should be appreciated that certain communication technologies provide better communication performance compared to other communication technologies. Therefore, a communication technology providing better performance may be preferred. For example, the plurality of SIM cards are classified into the first SIM card group and the second SIM card group according to the communication technology. If one or more SIM cards of the first SIM card group changes connection from 3G to 2G or from 4G to 3G, switching condition is satisfied in step 202 and wireless communication device 100 switches connection from the first SIM card group to the second SIM card group in step 203. It is beneficial to have a switching condition based on the communication technology because of the varying features of different communication technologies, wherein some specific features of certain communication technologies may be desired by users of wireless communication device 100.

Geographical Location:

In one of the embodiments, the switching condition is based on geographical location of wireless communication device 100. For illustration purposes, wireless communication device 100 is mounted on a moving vehicle. The second SIM card group is associated with a network having coverage in the particular geographical location. Therefore, when the switching condition is satisfied, wireless communications device 100 switches to the second SIM card group. The switching condition is satisfied when wireless communication device 100 is within a range of a particular geographical location. As the vehicle is moving, the geographical location of wireless communication device 100 may change frequently. A global positioning system (GPS) sensor is used by wireless communication device 100 to determine its geographical location. The GPS sensor is preferably housed inside wireless communication device 100. Alternatively the GPS sensor may also be a part of the vehicle, such that the GPS sensor is connected to wireless communication device 100 wirelessly or through a physical connection so that the GPS sensor is capable of sending information regarding geographical location to wireless communication device 100. When wireless communication device 100 enters the range of the particular geographical location, determines that the switching condition is satisfied. As the switching condition is satisfied, step 203 is performed by wireless communication device 100.

In one variant, wireless communication device 100 comprises a coverage noticer. The coverage noticer is integrated into wireless communication device 100, such that when the connection is switched to the second SIM card group after receiving information from the coverage noticer that wireless communication device 100 is outside the coverage area of networks associated with the first SIM card group.

According to one of the embodiments of the present invention, information of coverage area for network(s) associated with the SIM cards housed in wireless communication device 100 are stored in a storage medium. In one variant, when a SIM card is inserted, processing unit determines whether information of coverage area of a network associated with the SIM card has already been stored in the storage medium earlier. If the information of coverage area of the network associated with the SIM card has not been stored, the information of coverage area is retrieved from a remote server, and then stored in the storage medium. The remote server may be accessible through the Internet. In one variant, with the help of the information of coverage area and signals from the GPS sensor, wireless communication device 100 determines that it is about to move out of the coverage area of network(s) associated with the first SIM card group, and/or it is already inside the coverage area of network(s) associated with the second SIM card group.

In one example of this embodiment, a vehicle, such as a ferry, is travelling from Country A to Country B. Wireless communication device 100 is mounted on the ferry. Signals regarding geographical location of the ferry and wireless communication device 100 is received from the GPS sensor. A plurality of SIM cards are housed in wireless communication device 100. The plurality of SIM cards are classified into a first SIM card group and a second SIM card group, such that SIM cards in the first SIM card group are provided by service providers of Country A, and SIM cards in the second SIM card group are provided by service providers of country B. Information of coverage area of service providers of Country A and Country B may be stored in a storage medium of wireless communication device 100. It is possible that some areas are covered by service providers of both Country A and Country B. When the ferry is in Country A, wireless communication device 100 is connected to the Internet using the first SIM card group. With the help of information from the GPS sensor and information of coverage area, wireless communication device 100 determines that it is about to move out of the coverage area of service providers of country A as the ferry moves from Country A to Country B. Wireless communication device 100 then switches connection from the first SIM card group to the second SIM card group according to the process of FIG. 3A or FIG. 3B.

In one of the embodiments, the switching condition is based on geographical location and/or signal quality. When wireless communication device 100 is connected using SIM cards of the first SIM card group, wireless modem 104 may be used as a monitoring wireless modem. More precisely, wireless communication device 100 monitors the signal quality of connections corresponding to the second SIM card group using wireless modem 104. When there are a plurality of available SIM cards in the second SIM card group, wireless communication device 100 connects to a network associated with each available SIM card of the second SIM card group one by one using wireless modem 104. If wireless communication device 100 determines that signal quality of networks associated with the second SIM card group is better than signal quality of networks associated with the first SIM card group, wireless communication device 100 switches to the second SIM card group according to the process of FIG. 3A or FIG. 3B.

In one of the embodiments, the switching condition may also be based on instruction from administrator or a notification from an ISP. For example, if wireless communication device 100 receives an instruction from an administrator to switch connection from one SIM card to another SIM card, step 403 is performed. The instruction is received through a web interface, command line interface, application programming interface, and/or SMS message. In another example, an SMS message is received from a service provider of a SIM card that the network associated with the SIM card will undergo maintenance, and thus there may be disruptions in connectivity. The SMS message is received using the SIM card. Wireless communication device 100 then performs step 403 and connects to another SIM card instead, in order to avoid any connection drops.

Grouping Policy

According to one of the embodiments of the present invention, SIM cards are classified into a plurality of groups, such as the first and second SIM card groups, according to at least one grouping policy. Grouping policies can be based on various factors such as geographical coverage area, connection bandwidth, time, network identity, service provider, usage price and signal quality. One of the benefits of classifying SIM cards according to grouping policies is that networks of SIM cards of the same group can be used according to changes in network environment. The grouping policies and switching conditions are preferably based on the same factors, such that when a switching condition is satisfied, wireless communication device 100 can switch from one group of SIM cards to another group of SIM cards.

In one example of this embodiment, a plurality of SIM cards housed in wireless communication device 100 are classified into a first SIM card group and a second SIM card group. SIM cards provided by ISPs of a first geographical area are classified into the first SIM card group, and SIM cards provided by ISPs of a second geographical area are classified into the second SIM card group.

In another example of this embodiment, SIM cards associated with a service plan with connection bandwidth higher than or equal to 1 Mbps is classified into the first SIM card group, and SIM cards associated with a service plan with connection bandwidth lower than 1 Mbps is classified into the second SIM card group. In this example, a switching condition is to switch connection from the first SIM card group to the second SIM card group when the data to be transmitted and received does not require high bandwidth. This may reduce usage cost, as usage cost of high bandwidth connections may be higher than that of low bandwidth connections.

In another example of this embodiment, SIM cards to be used during a first time period are classified into a first SIM card group, and SIM cards to be used during a second time period are classified into a second SIM card group. For illustration purpose, SIM cards that have better performance in peak hours (12:00 PM to 12:00 AM) are in a first SIM card group, and remaining SIM cards are in a second SIM card group. In this example a switching condition is to switch connection to the second SIM card group at 12:00 AM, and use the second SIM card group in the off-peak hours. During peak hours, SIM cards of the first SIM card group are used, as they have better performance. It should be appreciated that there may be differences in cost, performance and reliability of connections during peak and off-peak hours.

In another example of this embodiment, viewing in conjunction with FIG. 1C, grouping policy is that SIM cards that can be used by the same wireless modem are classified into different SIM card groups. For illustration purpose, since SIM cards 111a and 111b can be used by wireless modem 101, they are in different SIM card groups, such as a first SIM card group and a second SIM card group respectively. Similarly, since SIM cards 112a and 112b can be used by wireless modem 102, SIM card 112a is in the first SIM card group and SIM card 112b is in the second SIM card group. Since SIM cards 113a and 113b can be used by wireless modem 103, SIM card 113a is in the first SIM card group and SIM card 113b is in the second SIM card group. Since SIM cards 114a and 114b can be used by wireless modem 104, SIM card 114a is in the first SIM card group and SIM card 114b is in the second SIM card group. The benefit of classifying SIM cards with this grouping policy is that, when switching from the first SIM car group to the second SIM card group is performed in step 203, each of the wireless modems can use a SIM card from the second SIM card group. If any two SIM cards that can be used by the same wireless modem are classified into the same SIM card group, such as the first SIM card group, that same wireless modem cannot use any SIM card after switching to the second SIM card group. For illustration purpose, SIM cards 111*a*, 111*b*, 112*a*, 113*a*, and 114*a* are in the first SIM card group, and SIM cards 112*b*, 113*b*, and 114*b* are in the second SIM card group. In this illustration, after switching to the second SIM card group, only wireless modems 102, 103 and 104 are connecting to networks using SIM cards 112*b*, 113*b* and 114*b*. Wireless modem 101 cannot use any of SIM cards 111*a* and 111*b* because both SIM cards 111*a* and 111*b* are in the first SIM card group. Wireless modem 101 therefore remains unused, and resources are not efficiently utilized. In contrast, when SIM cards 111*a* is in the first SIM card group, and SIM card 111*b* is in the second SIM card group, after switching to the second SIM card group, all four wireless modems 101, 102, 103, and 104 are being used to connect to networks using SIM cards 111*b*, 112*b*, 113*b* and 114*b* respectively.

FIG. 3A illustrates how step 203 is performed according to one of the embodiments of the present invention. When the switching condition is satisfied, wireless communication device 100 switches connection from the first SIM card group to the second SIM card group one by one.

In step 301, wireless communication device 100 switches connection from SIM card 111*a* to SIM card 111*b* by disconnecting from the first network and connecting to the second network using SIM card 111*b*. SIM card 111*b* is comprised in the second SIM card group. Wireless communication device 100 then determines in step 302 whether it is capable of transmitting and receiving data through the second network using SIM card 111*b*. If wireless communication device 100 is not capable of transmitting and receiving data using SIM card 111*b*, step 302 is performed and wireless communication device 100 continues receiving and transmitting data using the SIM cards 112*a*, 113*a* and 114*a* of the first group of SIM cards until it is capable of transmitting and receiving data using SIM card 111*b*. If wireless communication device 100 is capable of receiving and transmitting data using SIM card 111*b*, step 304 is performed. In step 304, wireless communication device 100 switches connection from SIM card 112*a* to 112*b* by disconnecting from the first network and connecting to the second network using SIM card 112*b*. In step 306, wireless communication device 100 determines whether it is capable of transmitting and receiving data using the connection of SIM card 112*b* through the second network. If it is not capable of transmitting and receiving data through the second network using SIM card 112*b*, a wait is performed in step 305. If wireless communication device 100 is capable of receiving and transmitting data through the second network, wireless communication device 100 switches connection from SIM card 113*a* to 113*b* in step 307 by disconnecting from the first network and connecting to the second network associated with SIM card 113*b*. If the switching is successful and wireless communication device 100 determines that it is capable of transmitting and receiving data through the second network using SIM card 113*b* in step 309, wireless communication device 100 switches connection from SIM card 114*a* to 114*b* in step 310 by disconnecting from the first network and connecting to the second network using SIM card 114*b*. Thus wireless communication device completes the switching from the first SIM card group to the second SIM card group as the switching condition is found to be satisfied.

In one variant, the wait in steps 302, 305 and 308 are only performed for a predefined time period. For example, when the predefined time period is over in step 302, step 304 is performed regardless of whether data can be transmitted or received using SIM card 111*b*.

It should be appreciated that, if wireless communication device 100 switches connection from all SIM cards of the first SIM card group to all SIM cards of second SIM card group at the same time or substantially the same time, Internet connectivity of the wireless communication device 100 may be disrupted temporarily. In this case, during the switching, the connections established using the first SIM card group are disconnected, while no connection has been established yet using the second SIM card. It is common that it may take time to establish a connection using a SIM card. Therefore, in the present invention, only when connection has been established successfully using at least one of the SIM cards of the second SIM card group, the wireless communication device 100 proceeds to connect using the SIM cards of the second SIM card group. At a given time, wireless communication device 100 has Internet connectivity using at least one SIM card from the first SIM card group or the second SIM card group.

FIG. 3B illustrates how step 203 is performed according to one of the embodiments of the present invention. When the switching condition is satisfied, wireless communication device 100 switches connection from the first SIM card group to the second SIM card group one by one. The first SIM card group comprises SIM cards 111*a*, 112*a*, 113*a* and 114*a*. The second SIM card group comprises SIM cards 111*b*, 112*b*, 113*b*, and 114*b*. Wireless modems 101-104 are capable of using SIM cards as illustrated in FIG. 1C. In step 311, wireless communication device 100 switches connection from SIM card 111*a* to SIM card 111*b* by disconnecting wireless modem 101 from the first network and connecting to the second network using SIM card 111*b*. Wireless communication device 100 then determines in step 312, whether it is capable of transmitting and receiving data through the second network using SIM card 111*b*. If wireless communication device 100 is not capable of transmitting and receiving data using SIM card 111*b*, step 313 is performed and wireless modem 101 again starts using SIM card 111*a* for receiving and transmitting data. If wireless communication device 100 is capable of receiving and transmitting data using SIM card 111*b*, step 313 is not performed, and wireless modem 101 continues using SIM card 111*b* for receiving and transmitting data.

In step 314, wireless communication device 100 switches connection from SIM card 112*a* to SIM card 112*b* by disconnecting wireless modem 102 from the first network and connecting to the second network using SIM card 112*b*. Wireless communication device 100 then determines in step 315 whether it is capable of transmitting and receiving data through the second network using SIM card 112*b*. If wireless communication device 100 is not capable of transmitting and receiving data using SIM card 112*b*, step 316 is performed and wireless modem 101 again starts using SIM card 112*a* for receiving and transmitting data. If wireless communication device 100 is capable of receiving and transmitting data using SIM card 112*b*, step 316 is not performed, and wireless modem 102 continues using SIM card 112*b* for receiving and transmitting data.

In step 317, wireless communication device 100 switches connection from SIM card 113*a* to SIM card 113*b* by disconnecting wireless modem 103 from the first network and connecting to the second network using SIM card 113*b*. Wireless communication device 100 then determines in step 318 whether it is capable of transmitting and receiving data through the second network using SIM card 113*b*. If wireless communication device 100 is not capable of transmitting and receiving data using SIM card 113b, step 319 is performed and wireless modem 101 again starts using SIM card 113a for receiving and transmitting data. If wireless communication device 100 is capable of receiving and transmitting data using SIM card 113b, step 319 is not performed, and wireless modem 103 continues using SIM card 113b for receiving and transmitting data.

In step 320, wireless communication device 100 switches connection from SIM card 114a to SIM card 114b by disconnecting wireless modem 104 from the first network and connecting to the second network using SIM card 114b. Wireless communication device 100 then determines in step 321 whether it is capable of transmitting and receiving data through the second network using SIM card 114b. If wireless communication device 100 is not capable of transmitting and receiving data using SIM card 114b, step 322 is performed and wireless modem 104 again starts using SIM card 114a for receiving and transmitting data. If wireless communication device 100 is capable of receiving and transmitting data using SIM card 114b, step 322 is not performed, and wireless modem 104 continues using SIM card 114b for receiving and transmitting data. The process ends in step 323.

It should be noted that not all of the plurality of SIM cards may be available for being used to connect to networks for various reasons. For example, among the plurality of SIM cards of wireless communication device 100, one or more SIM cards associated with prepaid services may not be available for use due to credit balance running low. In another example, one or more SIM cards may not be available due to network(s) associated with the one or more SIM cards being down for maintenance. In another example, one or more SIM cards may not be available when wireless communication device 100 is out of coverage area of network(s) associated with the one or more SIM cards. Therefore, when selecting SIM cards for transmitting and receiving data, wireless communication device 100 only selects one or more of the available SIM cards.

FIG. 4A is a flowchart illustrating a process according to one of the embodiments of the present invention. As illustrated in FIG. 1A, wireless communication device 100 houses a plurality of SIM cards 111a-114b. Wireless communication device 100 uses wireless modems 101, 102, and 103 for connecting to network(s) associated with the plurality of SIM cards. Wireless communication device 100 selects one or more of available SIM cards for connecting to one or more networks respectively. As wireless communication device 100 comprises three wireless modems 101-103 for connecting to networks, any three of the available SIM cards are selected in step 401. Wireless modem 104 is used as a monitoring wireless modem which monitors networks available for connection at wireless communication device 100.

In one example of this embodiment, SIM cards 111a, 111b, 112a, 112b, 113a, 114a, 114b are available SIM cards, and SIM cards 111a, 112b, and 114a are selected in step 401. Viewing in conjunction with FIG. 1D, wireless modems 101-104 are capable of connecting to any of the SIM cards 111a-114b. When SIM cards 111a, 112b and 114a are selected in step 401, SIM cards 111b, 112a, 113a, and 114b are remaining available SIM cards. Wireless communication device 100 connects to a first network using SIM cards 111a and 114a, and connects to a second network using SIM card 112b. In step 402, it is determined that wireless communication device 100 is unable to transmit or receive data using SIM card 112b through the second network. Wireless communication device 100 then selects a SIM card from the remaining available SIM cards, such as SIM card 112a, for connecting to a third network in step 403. In order to perform the selection at step 403, wireless modem 104 monitors connection of each of the remaining available SIM cards. In one variant, the selection at step 403 is performed randomly, or based on one or more factors such as usage price, usage cap, coverage area of corresponding network, and connection bandwidth. Table 0007 illustrates connections of SIM cards after step 401, and after step 403.

TABLE 0007

| SIM cards | After step 401 | After step 403 |
|---|---|---|
| SIM card 111a | Connected to First Network | Connected to First Network |
| SIM card 111b | Available | Available |
| SIM card 112a | Available | Connected to Third network |
| SIM card 112b | Connected to Second Network | Not available |
| SIM card 113a | Available | Available |
| SIM card 113b | Not available | Not available |
| SIM card 114a | Connected to First Network | Connected to First Network |
| SIM card 114b | Available | Available |

In another example of this embodiment, SIM cards 111a, 111b, 112a, 112b, 113a, 114a, 114b are available SIM cards, and SIM cards 111a, 112b and 113a are selected in step 401. When SIM cards 111a, 112b and 113a are selected in step 401, SIM cards 111b, 112a, 114a, and 114b are remaining available SIM cards. Viewing in conjunction with FIG. 1D, wireless modems 101-104 are capable of connecting to any of the SIM cards 111a-114b. Wireless communication device 100 connects to a first network using SIM card 111a through wireless modem 101, a second network using SIM card 112b through wireless modem 102, and a third network using SIM card 113a through wireless modem 103. Wireless communication device 100 transmits and receive data through the first, second and third network. In step 402, wireless communication device 100 determines whether it is unable to transmit or receive data using one or more SIM card through the first, second or third network. If wireless communication device 100 is unable to transmit or receive data using any of SIM cards 111a, 112b, or 113a, step 403 is performed. For example, when data cannot be transmitted using SIM card 112b, wireless communication device 100 selects another SIM card from the remaining available SIM cards instead of SIM card 112b in step 403. Therefore, wireless communication device 100 no longer sends or receives data using the second network using SIM card 112b. As wireless modem 102 stops using SIM card 112b, wireless modem 102 uses the selected SIM card for transmitting and receiving data after step 403. In order to perform step 403, wireless modem 104 monitors available networks using the remaining available SIM cards. The details of step 403 is described in FIG. 4B.

FIG. 4B is a flowchart illustrating a process of how step 403 is performed. In step 411, wireless communication device 100 determines which SIM cards are remaining available SIM cards. In one example, SIM cards 111b, 112a, 114a, and 114b are the remaining available SIM cards. In step 412, wireless modem 104 monitors networks of each of the remaining available SIM cards by using each of the remaining available SIM cards one by one. For example, wireless modem 104 first uses SIM card 111b to connect to a fourth network, and transmits predefined data for determining the performance. Performance information may be stored in a storage medium of wireless communication device 100. Wireless modem 104 repeats the same steps for SIM cards 112a, 114a and 114b. In step 413, wireless communication device 100 selects one of the remaining available SIM cards based on the performance information. If performance of the fourth network using SIM card 112*a* is determined to be the best, SIM card 112*a* is selected in step 413. In one variant, wireless modem 104 is capable of using any of SIM cards 111*a*-114*b*, wireless modem 101 is capable of using only SIM cards 111*a* or 111*b*, wireless modem 102 is capable of using only SIM cards 112*a* or 112*b*, and wireless modem 103 is capable of using only SIM cards 113*a* or 113*b*. Therefore, wireless modem 104 can perform step 412 and monitor networks of each of the remaining available SIM cards. When SIM card 112*a* is selected in step 413, SIM card 112*a* is used by wireless modem 102 for data communication, because wireless modems 103 and 104 are not capable of using SIM card 112*a*.

According to one of the embodiments of the present invention, wireless communication device 100 uses one of the plurality of available SIM cards. SIM cards that are available for use, but are not being used at a given time are regarded as remaining available SIM cards.

In one variant, user or administrator of wireless communication device 100 specifies the number of SIM cards to be used simultaneously for transmitting and receiving data. When there are three wireless modems available for connecting to networks, the user or administrator may specify number of SIM cards to be zero, one, two or three. The user or administrator is not able to specify the number of SIM cards to be more than three, as there are only three wireless modems available for connecting to networks.

In step 402, wireless communication device 100 may be unable to use a SIM card for various reasons. For example, connection using SIM card 112*b* may fail or there might be an error in connecting using SIM card 112*b*. Wireless communication device 100 then connects using another SIM card. In another example, wireless communication device 100 stops transmitting and receiving data using SIM card 112*b* and starts using another SIM card due to a switching condition, such that step 403 is performed when the switching condition is satisfied.

According to one of the embodiments, when wireless communication device 100 switches from a first SIM card group to a second SIM card group, or switches from one SIM card to another SIM card, a notification is sent to a user or administrator of wireless communication device 100. The notification can be an email, an instant message, a short message service (SMS), a phone call, a message shown in a web page, a popup message at a web page, an alarm, a sound, a blinking light, a light-emitting diode (LED) being turned on and other indicators that can be used to indicating an event has occurred.

According to one of the embodiments of the present invention, wireless communication device 100 establishes one or more end-to-end connections using the plurality of available SIM cards. The one or more end-to-end connections are bonded to form an aggregated end-to-end connection. Using an aggregated end-to-end connection may result in higher bandwidth which is a combined bandwidth of the individual end-to-end connections. The aggregated end-to-end connection is perceived as one end-to-end connection by sessions or applications that are using it. In one example, the end-to-end connection may be a VPN connection.

FIG. 5 illustrates network coverage areas of various networks and geographical locations in which wireless communication device 100 may be deployed according to various embodiments of the present invention. Coverage areas of networks 511, 512, and 513 are illustrated with circles labelled 511, 512 and 513 respectively. It should be noted that the coverage areas are illustrated with circles only for easy illustration. Wireless communication device 100 can be deployed in the different locations, i.e., locations 501-507. Locations 501-507 illustrate geographical locations at which wireless communication device 100 may be located, and behavior of wireless communication device 100 at the locations 501-507 are discussed below according to various embodiments of the present invention. In one example of this embodiment, it is possible that one or more SIM cards are used to connect to network 511 while the others are used to connect to network 512. For illustration purposes, wireless communication device 100 houses four SIM cards in the following examples. It should be appreciated that the scope of the invention is not limited to wireless communication device 100 housing only four SIM cards, such that one or more SIM cards may be housed at wireless communication device 100.

In one variant, each SIM card can be used for connecting to only one network. When wireless communication device 100 is in a coverage area of a network corresponding to a SIM card, the SIM card connects to the network. When wireless communication device 100 is not in the coverage area of the network, the SIM card is not connected to any network.

In one variant, each SIM card can be used for connecting to at least two networks, and a network is selected for connecting according to performance or according to coverage area. Roaming functionality is disabled. For example, if a SIM card can connect to a first network and a second network, and wireless communication device 100 is in a location that is in both the first and second network's coverage area, the SIM card connects to the network which has better performance. In another example, when wireless communication device 100 is in a location that is in the coverage area of the first network, but is not in the coverage area of the second network, the SIM card connects to the first network.

In one variant, when wireless communication device 100 uses a plurality of SIM cards, number of networks that wireless communication device 100 connects to is maximized, i.e. wireless communication device 100 connects to as many networks as possible. For example, each of the plurality of SIM cards can be used for connecting to a first and second network, at least one SIM card connects to the first network, and at least one SIM card connects to a second network for network diversity. Network diversity is to maximize the number of networks connected. If performance of the first network is better than the second network, one of the plurality of SIM card connects to the second network, and rest of the plurality of SIM cards connect to the first network.

In one variant, roaming functionality is enabled, but it is not preferred to use roaming service. Each SIM card can be used for connecting to a first at least one network without using roaming service, and can be used for connecting to at least one roaming network using roaming service. When wireless communication device 100 is in a location that is in the coverage area of a roaming network, and is not in the coverage area of the first at least one network, a SIM card connects to the roaming network. However, when wireless communication device 100 is in a location that is in the coverage area of the first at least one network, the SIM card does not connect to the roaming network, even though it can be used for connecting to the roaming network, because using roaming service is not preferred.

The implementations consider at least the next four scenarios. Table 0008 illustrates connections of SIM cards in different scenarios. In the scenarios described below, wireless communication device houses four SIM cards 111a-114a, and uses four different wireless modems, i.e. wireless modems 101-104 for connecting to networks associated with the four SIM cards respectively. SIM cards 111a-114a may or may not be classified into different groups for the purposes of the following scenarios. In the following Table 0008, "Connect to 511" means that when wireless communication device 100 is in the corresponding location, the SIM card is used for connecting to network 511. Similarly, "Connect to 512" and "Connect to 513" means that the SIM card is used for connecting to networks 512 and 513 respectively. "No connection means that the SIM card is not used for connecting to any network in the corresponding location. "Can connect to 511 or 512" means that the SIM card is capable of connecting to networks 511 and 512, but it only connects to one of the networks 511 and 512.

TABLE 0008

|  | Location | SIM card 111a | SIM card 112a | SIM card 113a | SIM card 114a |
|---|---|---|---|---|---|
| First Scenario - 111a - 511 112a - 511 113a - 512 114a - 512 | 500 | Connect to 511 | Connect to 511 | No connection | No connection |
|  | 501 | Connect to 511 | Connect to 511 | Connect to 512 | Connect to 512 |
|  | 502 | Connect to 511 | Connect to 511 | Connect to 512 | Connect to 512 |
|  | 503 | Connect to 511 | Connect to 511 | Connect to 512 | Connect to 512 |
|  | 504 | No connection | No connection | Connect to 512 | Connect to 512 |
|  | 505 | Connect to 511 | Connect to 511 | No connection | No connection |
|  | 506 | No connection | No connection | Connect to 512 | Connect to 512 |
|  | 507 | No connection | No connection | No connection | No connection |
| Second Scenario - 111a - 511, 512 112a - 511, 512 113a - 511, 512 114a - 511, 512 | 500 | Connect to 511 | Connect to 511 | Connect to 511 | Connect to 511 |
|  | 501 | Connect to 511 | Connect to 511 | Connect to 511 | Connect to 512 |
|  | 502 | Connect to 511 | Connect to 511 | Connect to 512 | Connect to 512 |
|  | 503 | Connect to 511 | Connect to 512 | Connect to 512 | Connect to 512 |
|  | 504 | Connect to 512 | Connect to 512 | Connect to 512 | Connect to 512 |
|  | 505 | Connect to 511 | Connect to 511 | Connect to 511 | Connect to 511 |
|  | 506 | Connect to 512 | Connect to 512 | Connect to 512 | Connect to 512 |
|  | 507 | No connection | No connection | No connection | No connection |
| Third Scenario - 111a - 511, 512, roam in 513 112a - 511, 512, roam in 513 113a - 511, 512, roam in 513 114a - 511, 512, roam in 513 (roaming not preferred) | 500 | Connect to 511 | Connect to 511 | Connect to 511 | Connect to 511 |
|  | 501 | Connect to 511 | Connect to 511 | Connect to 511 | Connect to 512 |
|  | 502 | Connect to 511 | Connect to 511 | Connect to 512 | Connect to 512 |
|  | 503 | Connect to 511 | Connect to 512 | Connect to 512 | Connect to 512 |
|  | 504 | Connect to 512 | Connect to 512 | Connect to 512 | Connect to 512 |
|  | 505 | Connect to 511 | Connect to 511 | Connect to 511 | Connect to 511 |
|  | 506 | Connect to 512 | Connect to 512 | Connect to 512 | Connect to 512 |
|  | 507 | Connect to 513 | Connect to 513 | Connect to 513 | Connect to 513 |
| Fourth Scenario - 111a - 511, 512, 513 112a - 511, 512, roam in 513 113a - 511, 512 114a - 511, prefer 512 | 500 | Connect to 511 | Connect to 511 | Connect to 511 | Connect to 511 |
|  | 501 | Can connect to 511 or 512 | Can connect to 511 or 512 | Can connect to 511 or 512 | Connect to 512 |
|  | 502 | Can connect to 511 or 512 | Can connect to 511 or 512 | Can connect to 511 or 512 | Connect to 512 |
|  | 503 | Can connect to 511 or 512 | Can connect to 511 or 512 | Can connect to 511 or 512 | Connect to 512 |
|  | 504 | Connect to 512 | Connect to 512 | Connect to 512 | Connect to 512 |
|  | 505 | Can connect to 511 or 513 | Connect to 511 | Connect to 511 | Connect to 511 |

TABLE 0008-continued

| Location | SIM card 111a | SIM card 112a | SIM card 113a | SIM card 114a |
|---|---|---|---|---|
| 506 | Connect to 512 | Connect to 512 | Connect to 512 | Connect to 512 |
| 507 | Connect to 513 | Connect to 513 | No connection | No connection |

In a first scenario, SIM cards 111a and 112a are capable of connecting to network 511 and SIM cards 113a & 114a are capable of connecting to network 512. In this scenario, when wireless communication device 100 is in location 500 or 505, it connects to network 511 using SIM card 111a and/or SIM card 112a. In locations 500 and 505, wireless communication device 100 is not able to connect to network 512 using SIM cards 113a and 114a because locations 500 and 505 are outside the coverage area of network 512. When wireless communication device 100 is in locations 501, 502, or 503, SIM cards 111a and 112a are used to connect to network 511 while SIM cards 113a and 114a are used to connect with network 512. When wireless communication device 100 is in location 504 or 506, there is no network connection using SIM 111a & SIM 112a, as locations 504 and 506 are outside the coverage area of network 511, while SIM 113a and SIM 114a are connected to network 512. In one embodiment of the present invention, when the wireless communication device 100 is in location 507, the wireless communication device 100 is not connected to any network 511 or 512, as location 507 is outside coverage areas of both networks 511 and 512.

In the second scenario, SIM cards 111a, 112a, 113a and 114a are all capable of connecting to networks 511 and 512 but not to network 513. It should be noted that at a given time, each SIM card only connects to one of the network 511 or 512, and one SIM card cannot connect to both networks 511 and 512 at the same time. In one of the embodiments of the present invention, wireless communication device is configured such that network diversity is preferred. For example, when wireless communication device 100 is within the coverage areas of both network 511 and network 512, at least one wireless modem connects to network 511 and at least one wireless modem connects to network 512, even when the performance through network 511 is better than the performance through network 512. In this case, if connection to network 511 fails for some reason, wireless communication device 100 is still connected to network 512 and will still have Internet connectivity. Connection to network 511 may fail due to many reasons, such as network maintenance, hardware failure, etc. Roaming functionality is disabled for all SIM cards. According to the second scenario, when wireless communication device 100 is in location 500 or 505, all the SIM cards are connected to network 511 since wireless communication device 100 is outside the coverage area of network 512. When communication device 100 is in location 501, SIM cards 111a, 112a, and 113a are connected to the network 511 for better performance, while SIM 114a is connected to the network 512 in order to have network diversity.

Network performance may be determined based on different performance parameter like throughput, error rates, quality of service, bandwidth, capacity, signal level, signal-to-noise ratio, etc. When wireless communication device 100 is in location 502, SIM 111a and SIM 112a are connected to network 511 for better performance. SIM 113a is connected to network 512, as network performance is determined to be better when SIM card 113a is connected to network 512 compared to when SIM card 113a is connected to network 511. SIM 114a is connected to network 512 in order to have the network diversity. When the wireless communication device is in location 503, SIM 111a is connected to network 511 in order to have the network diversity while SIM cards 112a, 113a, and 114a are connected to network 512 for better performance. When the wireless communication device 100 is in location 504 or 506, all four SIM cards are connected to network 512 since wireless communication device 100 is out of the coverage area of network 511. When the wireless communication device 100 is in location 507, all four SIM cards are disconnected and wireless communication device 100 is not connected to any network since wireless communication device is out of the coverage area of both networks 511 and 512 and all four SIM cards are not capable of being used to connect to network 513.

In the third scenario of the present invention, all four SIM cards 111a-114a are capable of connecting to networks 511 and 512 and also capable of connecting to network 513 by using roaming service when the wireless communication device 100 is located within the network coverage area of network 513. In the third scenario, although roaming functionality is enabled, it is not preferred to use roaming service. Roaming service is only used when wireless communication device 100 is not capable of connecting to any other network such as networks 511 and 512. In one example of the present invention, when wireless communication device 100 is in location 500 or 505, all four SIM cards are connected to the network 511 since wireless communication device 100 is out of the coverage area of network 512. In location 505, even though wireless communication device 100 is within coverage area of network 513, SIM cards 111a-114a connect to network 511, and not to network 513 because using roaming service is not preferred. There are no SIM cards which can connect to network 513 without using roaming services, and using roaming services is not preferred. When wireless communication device 100 is in location 501, SIM cards 111a, 112a and 113a are connected to the network 511, as network performance through network 511 is better than network performance through network 512 in location 501. Network performance may be determined based on different performance parameter like throughput, error rates, quality of service, bandwidth, capacity, signal level, signal-to-noise ratio, etc. SIM 114a is connected to network 512 to make sure that wireless communication device 100 is connected to a network even if one of the network connection fails. Failure of connection between wireless modem i.e., wireless modem 101-104 to any network can happen for various reason like maintenance of network device, equipment failure, congestion, operator error etc. When wireless communication device 100 is in location 502, SIM cards 111a and 112a are connected to network 511 for better performance. SIM 113a is connected to network 512 for better performance. SIM 114a is connected to network 512 in order to have network diversity. In one example of the present invention, when wireless communication device 100 is in location 503, SIM 111a is connected to the network 511 in order to have the network diversity while the SIM cards 112a, 113a and 114a are connected to the network 512 since in that location performance of network 512 is better than the performance of network 511. When the wireless communication device is in location 504 or 506, all four SIM cards are connected to network 512 since wireless communication device 100 is out of the coverage area of network 511. SIM cards 111a-114a cannot connect to network 513 without using roaming service and using roaming service isn't preferred. When the communication device is in location 507, all four SIM cards are connected to network 513 since wireless communication device 100 is out of the coverage areas of both networks 511 and 512. Although using roaming service is not preferred, SIM cards 111a-114a connect to network 513 in order to have Internet connectivity at wireless communication device 100.

In the fourth scenario, SIM 111a can be used for connecting to networks 511, 512, and 513, SIM 112a can be used for connecting to networks 511 and 512, and also capable of using the network 513 using roaming service, and SIM 113a can be used for connecting to networks 511 and 512. SIM 114a can be used for connecting to networks 511 and 512, but prefer network 512 for various reason like usage price, data usage capacity, bandwidth of that network or the like. In one example of the fourth scenario, when wireless communication device 100 is in location 500, all four SIM cards are connected to network 511 since wireless communication device 100 is out of the coverage areas of networks 512 and 513. When the device is in locations 501, 502, and 503, the SIM cards 111a, 112a, and 113a connects to either network 511 or 512 but SIM 114a only connects to network 512 since it is the preferred network for SIM 114a. In one variant of the present invention, wireless communication device 100 may prefer one network over another network for various reason like usage price, performance, usage limit, and/or bandwidth etc. of that network when wireless communication device is within the network coverage area of both networks. When the wireless communication device 100 is in location 504, all four SIM cards are connected to network 512 since wireless communication device is out of the coverage areas of the networks 511 and 513. When wireless communication device is in location 505, SIM 111a connects to either network 511 or 513. SIM 112a is connected to network 511 since SIM 112a needs to use roaming service in order to connect to network 513 and roaming service isn't preferred. SIM cards 113a and 114a are connected to network 511 since SIM cards 113a and 114a are not capable of connecting to network 513 and wireless communication device 100 is out of the coverage area of network 512. When wireless communication device 100 is in location 506, all four SIM cards will connect to network 512 since wireless communication device 100 is out of the coverage area of network 511, and SIM cards 113a and 114a are not capable of connecting to network 513. SIM 112a does not connect to network 513 as using roaming services is not preferred. When wireless communication device 100 is in location 507, SIM cards 111a and 112a are connected to network 513 while SIM cards 113a and 114a are not connected to any network. SIM cards 113a and 114a are not connected to any network because they are not capable of connecting to network 513 and wireless communication device 100 is out of the coverage areas of the networks 511 and 512.

In one embodiment of the present invention, wireless communication device 100 determines its geographical location by the strength of the network signals. For instance, if wireless communication device 100 is located at the middle of the coverage area of network 511, the signal strength would be the highest for a wireless modem, such as wireless modems 101-104, which is connected to network 511. In one variant of the present invention, a wireless modem cannot connect to the two different network at the same time. If wireless communication device 100 is located at the edge of the coverage area of network 511, the signal strength for a wireless modem, such as wireless modems 101-104, which is connected to network 511 would be comparatively lower. In this way, wireless communication device 100 can determine if it is located within the coverage area for a specific network. However, it may not be possible in all cases since when one wireless modem is associated with one network, it may not able to find the signal strength of the other networks. For example, if the wireless modem 101 is connected to the network 511, it is not possible for the wireless modem 101 to determine the signal strength of the networks 512 or 513. Only the other wireless modems i.e., wireless modems 102, 103 and/or 104, can find the signal strength of the other networks i.e., networks 512 and 513.

In one embodiment of the present invention, the wireless communication device 100 can detect its position when a wireless modem is switched to another network or the wireless modem is using the roaming functionality. For example, if a wireless modem i.e., wireless modem 102 is switched from the network 511 to the network 512, wireless communication device 100 can determine that it is located within the coverage area of network 512. In one variant of the present invention, when any one of the wireless modems 101-104 is using the roaming functionality, the wireless communication device 100 can determine which network's coverage area it is located in i.e., coverage area of network 511, 512 and/or 513. For example, if the wireless modem 101 is using a network, such as network 512 using roaming services using the same SIM card which was used to connect to another network i.e., network 511, wireless communication device 100 can determine that it is located in the coverage area of network 512.

According to one of the embodiments of the present invention, wireless communication device 100 connects to a GPS sensor to detect its geographical location.

According to one of the embodiments of the present invention, wireless communication device 100 determines its geographical location based on network identity of available networks. For example, when network identity of an available non-roaming network is provided by Smartone Macau, wireless communication device 100 determines that its geographical location is in Macau. When network identity of an available non-roaming network is provided by PCCW, wireless communication device 100 determines that its geographical location is in Hong Kong. The network identity is determined based on mobile country code (MCC) and mobile network code (MNC) of a network.

According to one of the embodiments of the present invention, wireless communication device 100 uses SIM cards and wireless modems based, at least in part, on mobile country code (MCC) of available networks. A user or administrator can input a list of allowed mobile country codes (MCC) for each SIM card. The user or administrator uses a user interface for input the list of allowed MCC. It is common that there is a preferred network with a specific MCC for a SIM card, even when the wireless communication device 100 can use the SIM card for connecting to other networks with different MCCs. In one scenario, a SIM card of Verizon Wireless has a preferred network in the United States of America (USA) with MCC 310. The SIM card may be able to connect to networks of other regions with different MCC using roaming functionality, although networks with MCC other than MCC 310 may not be preferred. Therefore, the list of allowed MCC is used in order to avoid connecting to non-preferred networks through any SIM card. In one example, as illustrated in FIG. 6A, the user inputs allowed MCCs for SIM cards in table 600. Table 600 may be stored as a database in a storage medium, such as secondary storage 132 of wireless communication device 100. Alternatively, table 600 may be stored in a remote server which can be accessed by wireless communication device 100 through a network. Column 601 is a list of SIM cards that can be used by a wireless modem for connecting to a network with corresponding allowed MCC, and column 602 is a list of allowed MCC for the SIM cards in column 601. For illustration purpose, wireless communication device 100 houses four SIM cards 111a, 112a, 113a, and 114a. Allowed MCC for SIM card 111a is MCC 208, allowed MCC for SIM card 112a is MCC 460 (China), allowed MCC for SIM card 113a is MCC 208 (France) and MCC 234 (United Kingdom), and allowed MCC for SIM card 114a is MCC 234 (United Kingdom).

FIG. 7 is a flowchart illustrating a process of using SIM cards based on network identity according to one of the embodiments of the present invention. In step 701, wireless communication device 100 monitors network identities of available networks. Wireless modems 101-104 can use SIM cards for scanning available networks in the geographical area of wireless communication device 100, and determine MCC of the available networks. In step 702, it is determined whether MCC of any available networks match allowed MCC of any SIM cards. If an MCC of an available network does not match any of the allowed MCC, wireless communication device 100 does not connect to the available network in step 705. If an MCC of an available network matches allowed MCC of any SIM card, in step 703, wireless communication device 100 determines to connect to the available network using a SIM card whose allowed MCC matches the MCC of the available network. In step 704, one of the wireless modems 101-104 uses the SIM card for connecting to the available network.

For illustration purpose, wireless communication device 100 is in the United Kingdom (UK). MCC of networks in the UK is MCC 234. Viewing FIG. 7 in conjunction with FIG. 6A, when network identities are monitored in step 701, it is likely that MCC of most available networks are found to be MCC 234, as wireless communication device 100 is in UK. In step 702, wireless communication device 100 determines whether MCC 234 matches any allowed MCC in column 602 of table 600. It is then determined that MCC 234 is an allowed MCC for SIM cards 113a and 114a. Therefore, in step 703, wireless communication device 100 determines to use SIM cards 113a and 114a to connect to corresponding available networks with MCC 234 for data communication. In one example of this embodiment, viewing in conjunction with FIG. 1D, any wireless modem 101-104 is capable of using SIM cards 113a and 114a. For illustration purpose, wireless modem 101 uses SIM card 113a, and wireless modem 102 uses SIM card 114a. Therefore, in step 704, wireless communication device 100 uses wireless modem 101 to connect to a first available network with MCC 234 corresponding to SIM card 113a, and also uses wireless modem 102 to connect to a second available network with MCC 234 corresponding to SIM card 114a. The first available network and the second available network may be the same network, or may be two different networks. It is possible that SIM cards 111a and 112a are capable of connecting to available networks using roaming service, but wireless communication device 100 does not use SIM cards 111a and 112a to connect to any networks as MCC 234 is not an allowed MCC for SIM cards 111a and 112a. In another example of the same embodiment, viewing in conjunction with FIG. 1C, only wireless modem 103 is capable of using SIM card 113a, and only wireless modem 104 is capable of using SIM card 114a. Therefore, in step 704, wireless modems 103 and 104 are used to connect to the first and second available networks respectively.

In one variant, it is possible that wireless modems 101-104 are only usable in specific geographical area(s). For example, wireless modems 101-104 are manufactured and configured such that they can only be used in Japan. In this case, even though there are available networks with MCC 234, and wireless communication device 100 determines to use SIM cards 113a and 114a in step 703, step 704 cannot be performed because none of the wireless modems 101-104 are capable of connecting to a network in the UK. As step 704 is not performed, the process ends, and wireless communication device 100 is not connected to any network. In another example, in step 702, wireless communication device 100 determines whether MCC of any available network matches with allowed MCC of any SIM cards, and also determines whether MCC of any available network matches with allowed MCC of any wireless modem. If wireless modems 101-104 can only be used in Japan, allowed MCC of wireless modems 101-104 is MCC 440. As MCC 234 does not match MCC 440, step 705 is performed and wireless communication device 100 does not connect to any of the available networks with MCC 234.

In another example, wireless communication device 100 is in Thailand. MCC of networks in Thailand is MCC 520. Viewing FIG. 7 in conjunction with FIG. 6A, when network identities are monitored in step 701, it is likely that MCC of most available networks are found to be MCC 520, as wireless communication device 100 is in Thailand. In step 702, wireless communication device 100 determines whether MCC 520 matches any allowed MCC in column 602 of table 600. It is then determined in step 702 that MCC 520 is not an allowed MCC for any of the SIM cards 111a-114a. Step 705 is performed, and wireless communication device 100 does not use any of the SIM cards 111a-114a to connect to any available networks with MCC 520.

According to one of the embodiments, wireless communication device 100 uses SIM cards based, at least in part, on both MCC and mobile network code (MNC). For example, the user or administrator uses a user interface for input the list of allowed MCC and a list of allowed MNC for each SIM card. As illustrated in FIG. 6B, the user inputs allowed MCCs and MNCs for SIM cards in table 610. Column 601 is a list of SIM cards that can be used by a wireless modem for connecting to a network with corresponding allowed MCC-MNC, and column 603 is a list of allowed MCC-MNC for the SIM cards in column 601. For illustration purpose, wireless communication device 100 houses four SIM cards 111a, 112a, 113a, and 114a. Allowed MCC-MNC for SIM card 111a is MCC-MNC 208+02; a network Orange of France has MCC 208 and MNC 02. Allowed MCC-MNC for SIM card 112a is MCC-MNC 460-01; a network China Unicom of China has MCC 460 and MNC 01. Allowed MCC-MNC for SIM card 113a is MCC-MNC 208-04 and 234-03; a network Sisteer of France has MCC 208 and MNC 04 and a network Airtel-Vodafone of UK has MCC 234 and MNC 03. Allowed MCC-MNC for SIM card 114*a* is MCC-MNC 234-02; a network 02 (UK) of UK has MCC 234 and MNC 02.

For illustration purpose, wireless communication device 100 is in the United Kingdom (UK). MCC of networks in the UK is MCC 234. Viewing FIG. 7 in conjunction with FIG. 6B, when network identities, i.e. MCC-MNC, are monitored in step 701, it is likely that MCC of most available networks are found to be MCC 234. In step 702, wireless communication device 100 determines whether MCC-MNC of any available network matches any allowed MCC-MNC in column 603 of table 610. If there is any available network with MCC-MNC 234-03 or 234-02, it is determined that MCC-MNC of an available network matches one of the allowed MCC-MNC. If a first available network has MCC-MNC 234-03, SIM card 113*a* is determined to be used for connecting to the first available network in step 703. In step 704, wireless communication device 100 uses a wireless modem that is capable of using SIM card 113*a* to connect to the first available network. If a second available network has MCC-MNC 234-02, SIM card 114*a* is determined to be used for connecting to the second available network in step 703. In step 704, wireless communication device 100 uses a wireless modem that is capable of using SIM card 114*a* to connect to the second available network. Wireless communication device 100 can connect to both the first and second available network using SIM cards 113*a* and 114*a* respectively. If there is no available network with MCC-MNC 234-03 or 234-02, it is determined that MCC-MNC of an available network does not match one of the allowed MCC-MNC, and wireless communication device does not connect to any available network in step 705. Therefore, even if there is an available network with MCC 234, but a different MNC, such as MNC 04, step 705 is performed because MCC-MNC 234-04 is not in the list of allowed MCC-MNC.

According to one of the embodiments, the user or administrator inputs the list of allowed MCC in column 602, and the list of allowed MCC-MNC in column 603 locally or remotely through a web interface, an application programming interface (API), a command line interface or a console.

The embodiments were chosen and described in order to best explain the principles of the invention and its practical applications, to thereby enable others skilled in the art to best utilize the invention and various embodiments with various modifications as are suited to the particular use contemplated.

BRIEF DESCRIPTION OF DRAWINGS

FIG. 6A is a table illustrating a list of allowed MCCs for SIM cards according to one of the embodiments of the present invention;

Figure 1A:
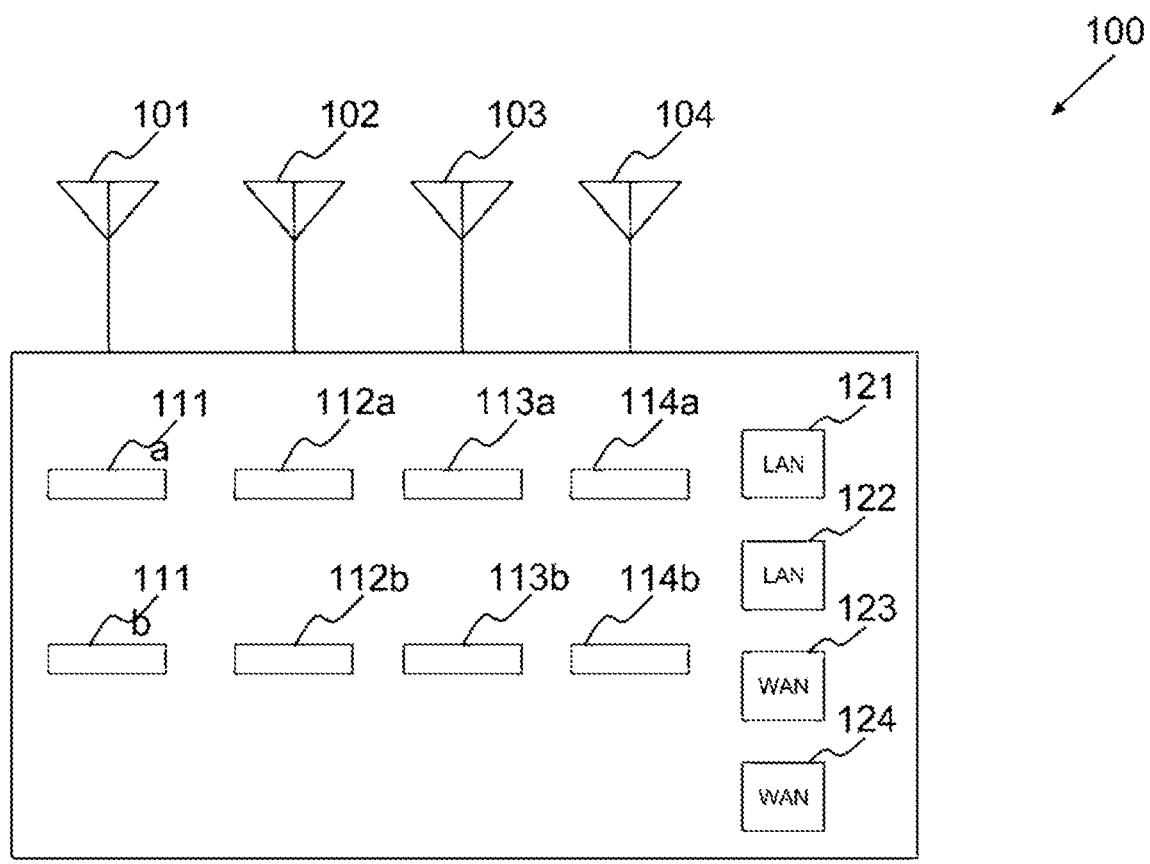
FIG. 1A is a block diagram illustrating the system of a wireless communications device, according to one of the embodiments of the present invention.
Figure 1B:
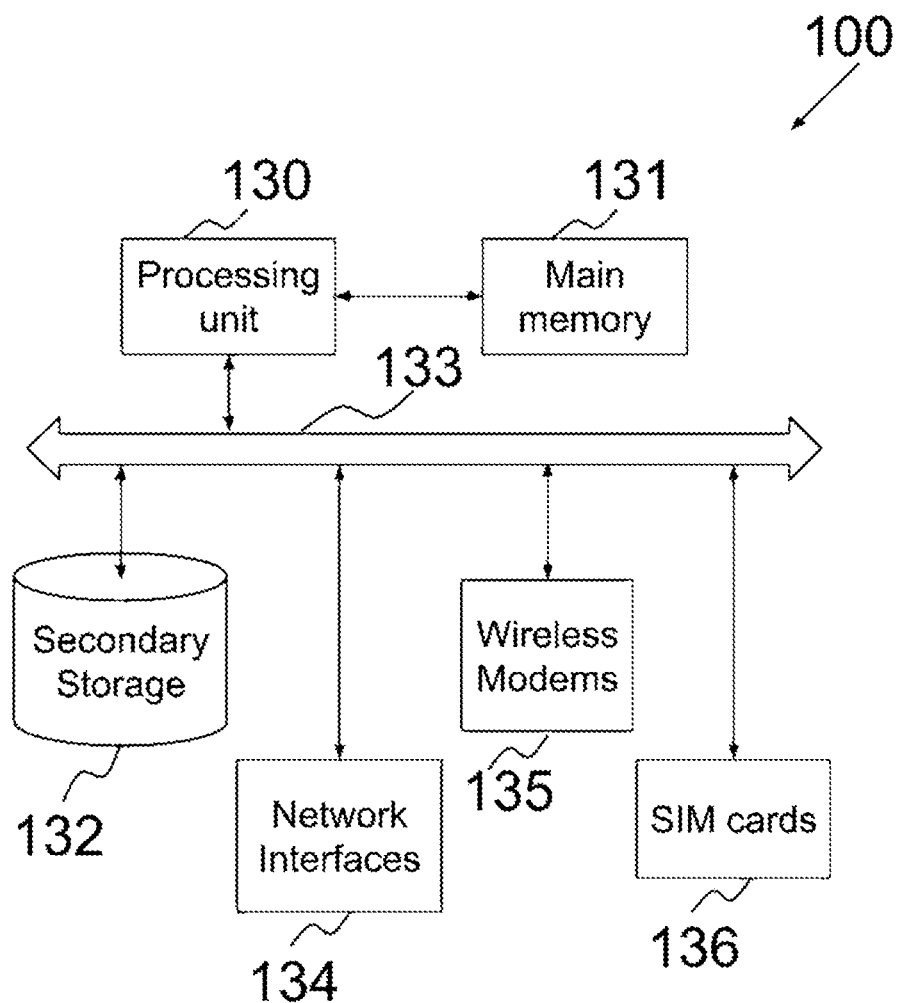
FIG. 1B is a block diagram illustrating the architecture of the wireless communication device, according to one of the embodiments of the present invention.
Figure 1C:
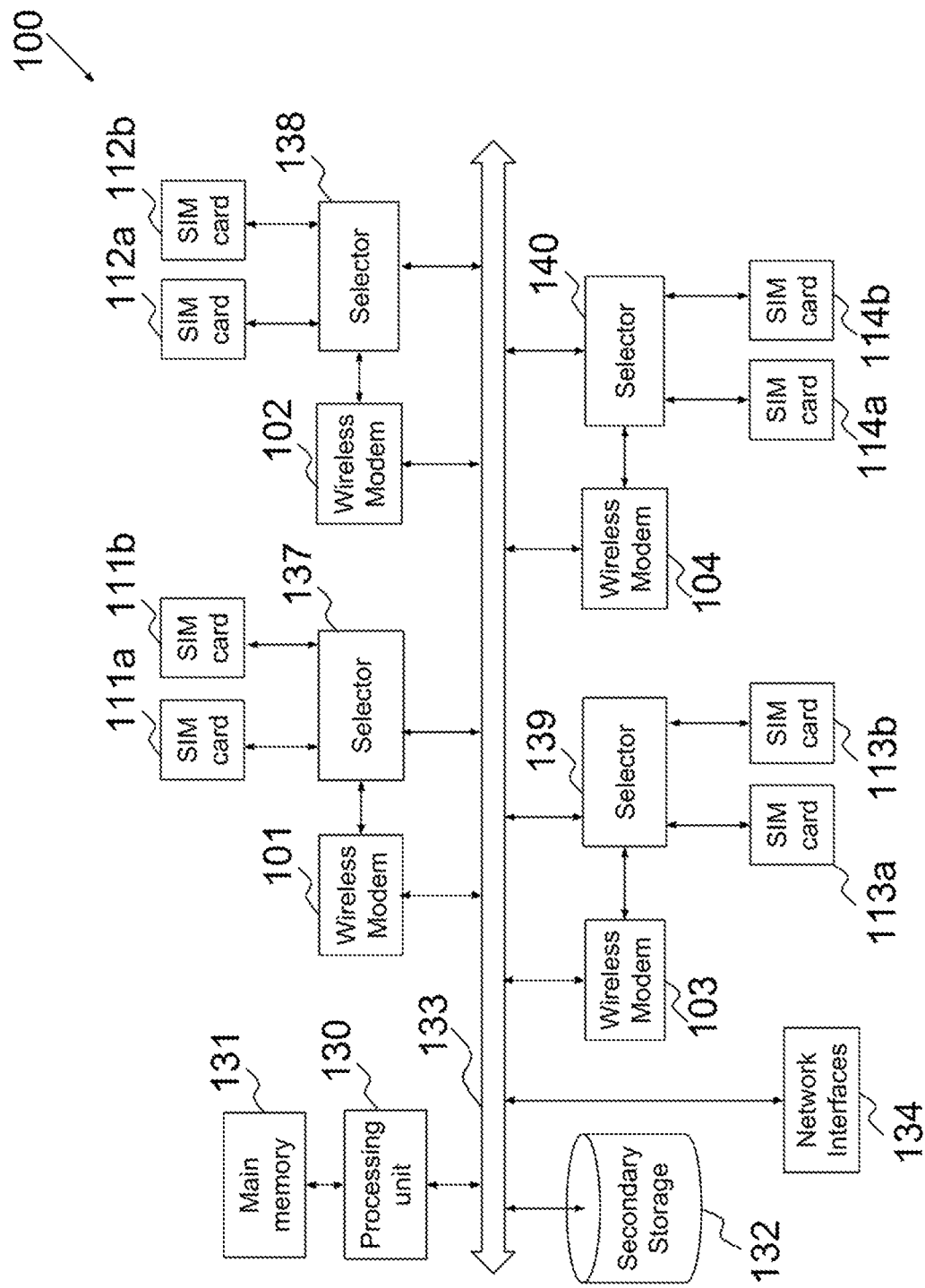
FIG. 1C is a block diagram illustrating the architecture of the wireless communication device, according to one of the embodiments of the present invention.
Figure 1D:
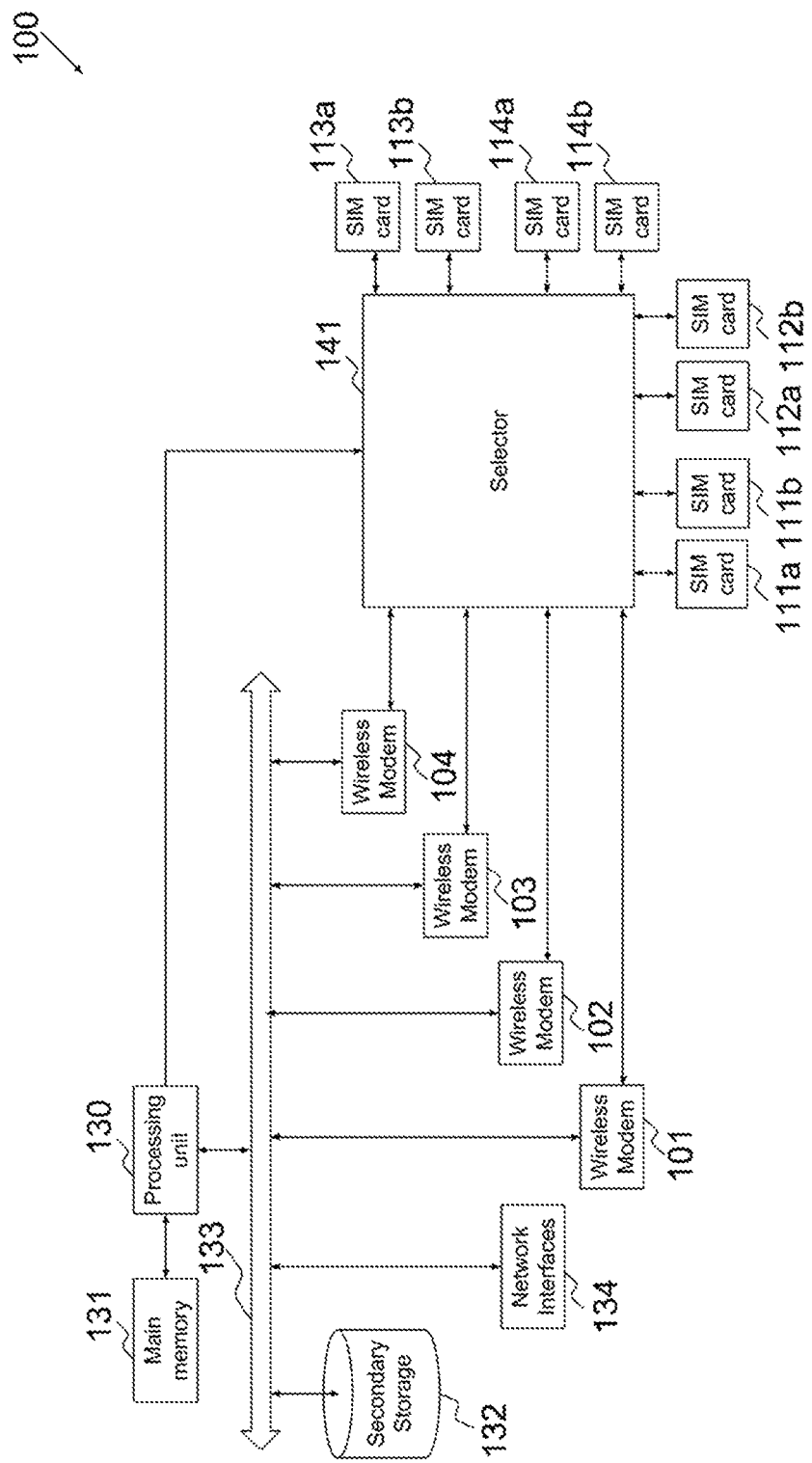
FIG. 1D is a block diagram illustrating the architecture of the wireless communication device, according to one of the embodiments of the present invention.
Figure 2:
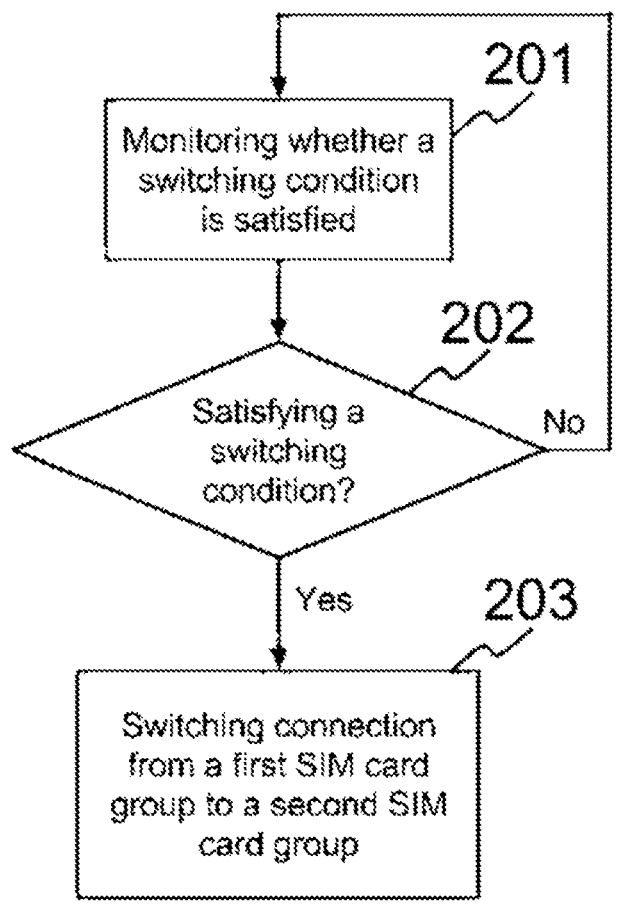
FIG. 2 is a flowchart illustrating a process according to one of the embodiments of the present invention.
Figure 3A:
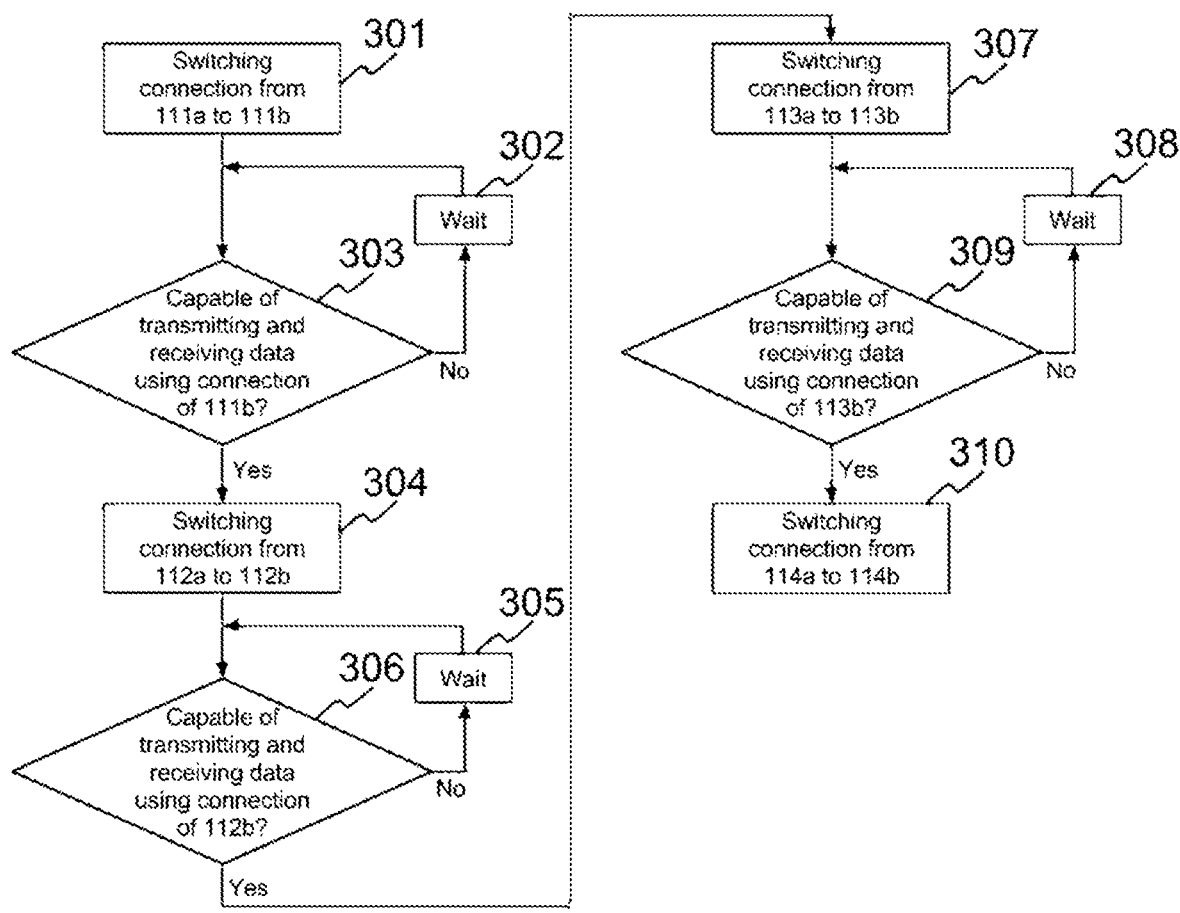
FIG. 3A illustrates how step 203 of FIG. 2 is performed according to one of the embodiments of the present invention.
Figure 3B:
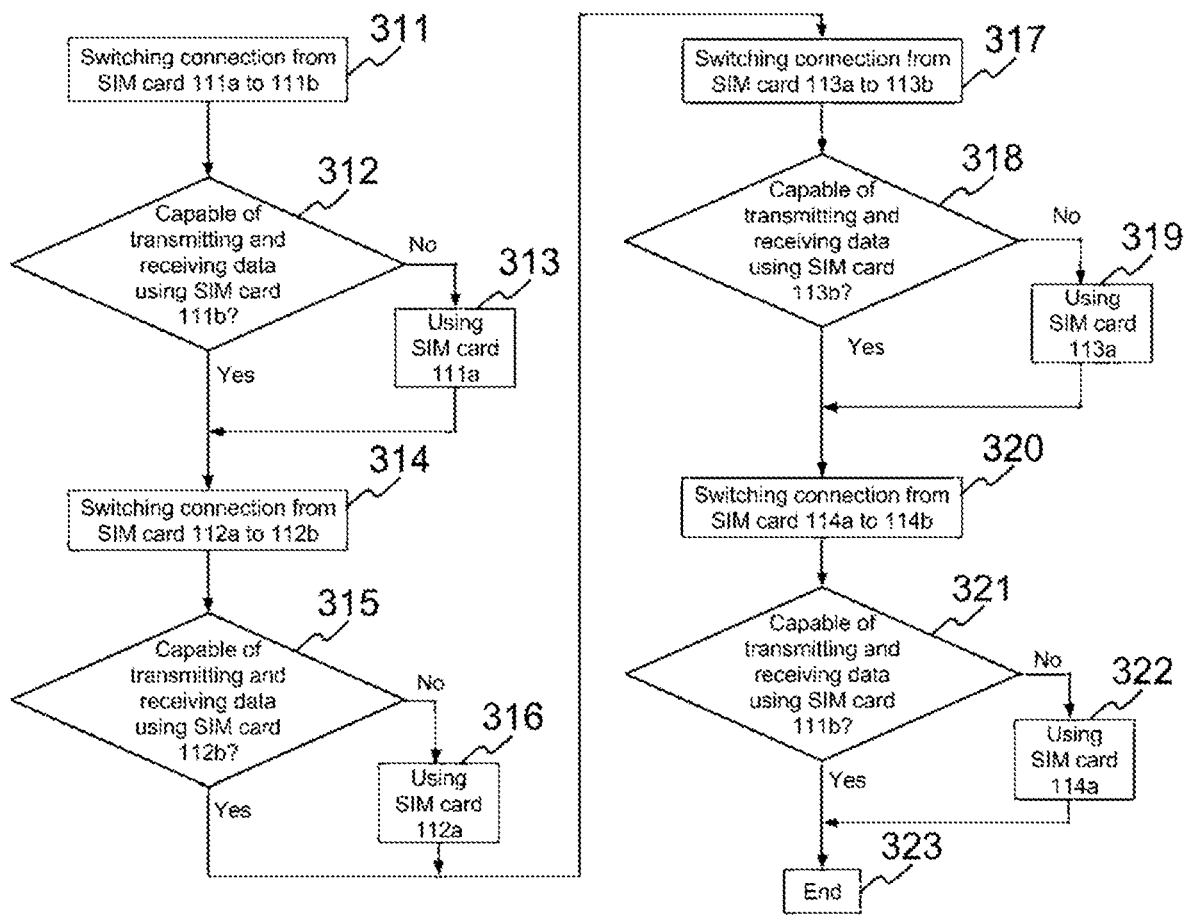
FIG. 3B illustrates how step 203 of FIG. 2 is performed according to one of the embodiments of the present invention.
Figure 4A:
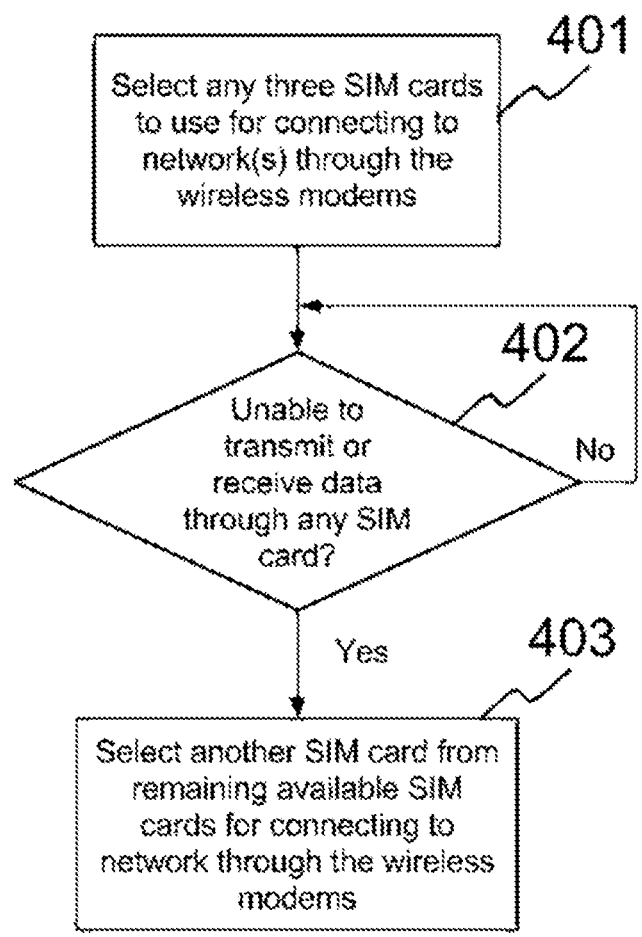
FIG. 4A is a flowchart illustrating a process according to one of the embodiments of the present invention.
Figure 4B:
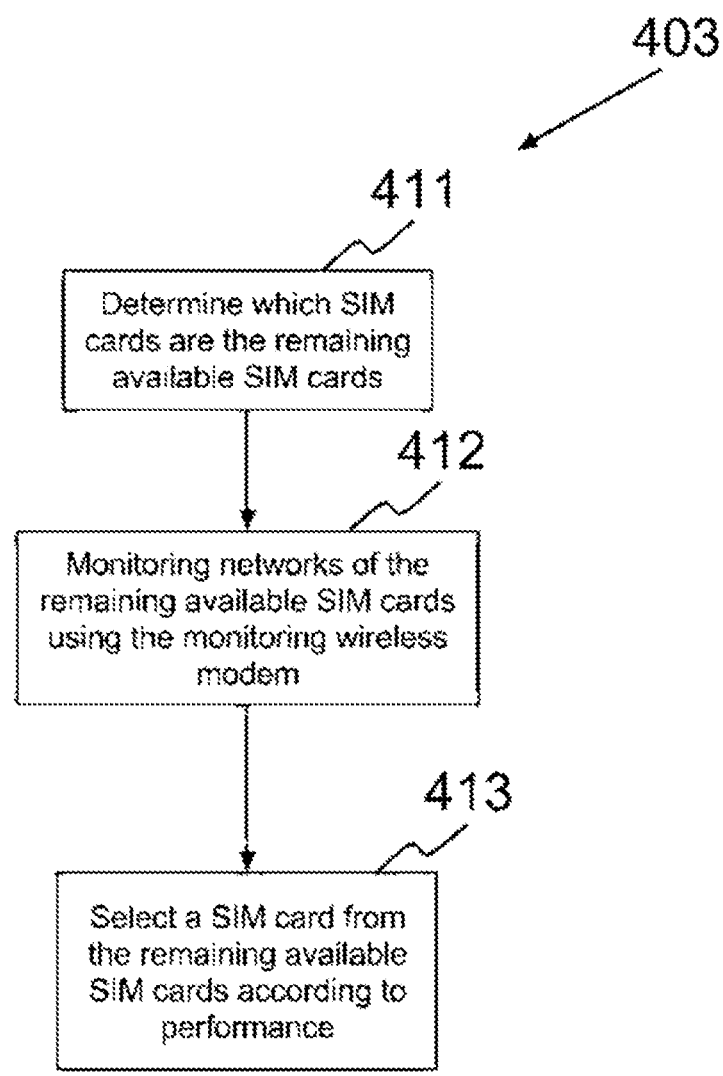
FIG. 4B is a flowchart illustrating a process of how step 403 of FIG. 4A is performed according to one of the embodiments of the present invention.
Figure 5:
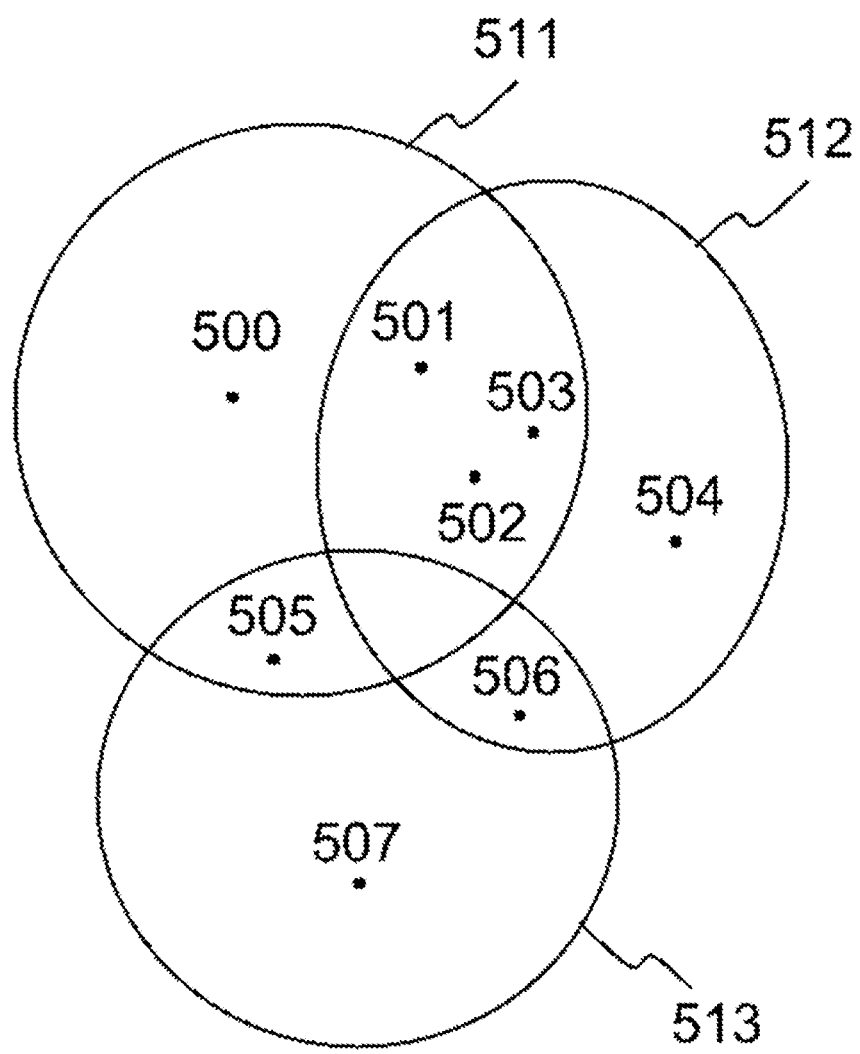
FIG. 5 illustrates network coverage areas of various networks and geographical locations in which a wireless communication device may be deployed according to various embodiments of the present invention.
Figure 6B:
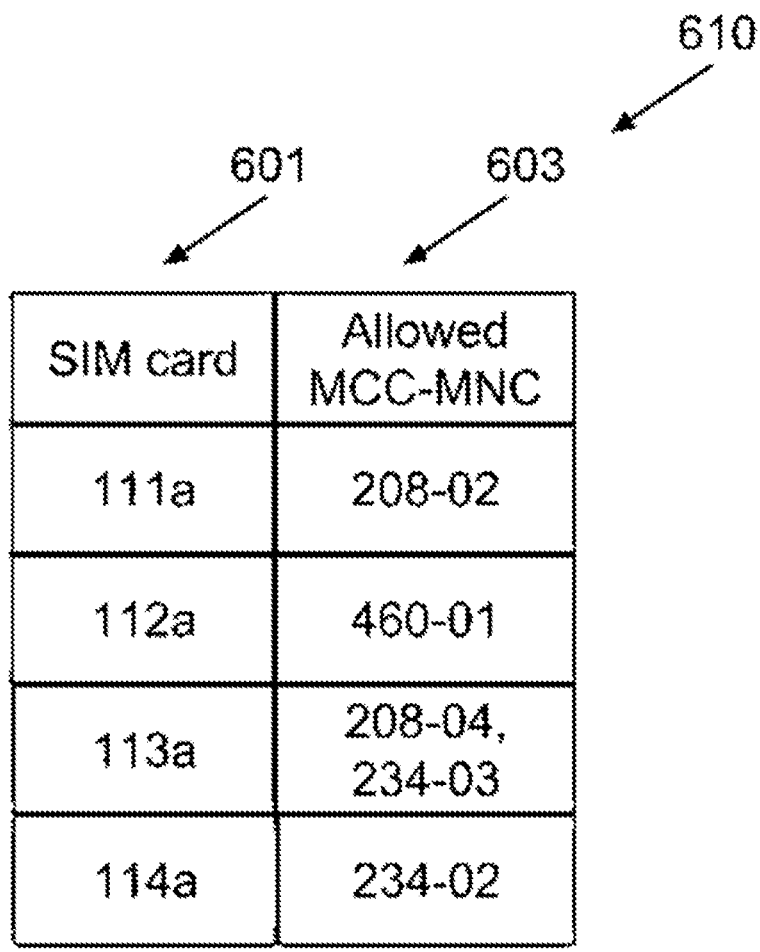
FIG. 6B is a table illustrating a list of allowed MCCs and MNCs for SIM cards according to one of the embodiments of the present invention.
Figure 7:
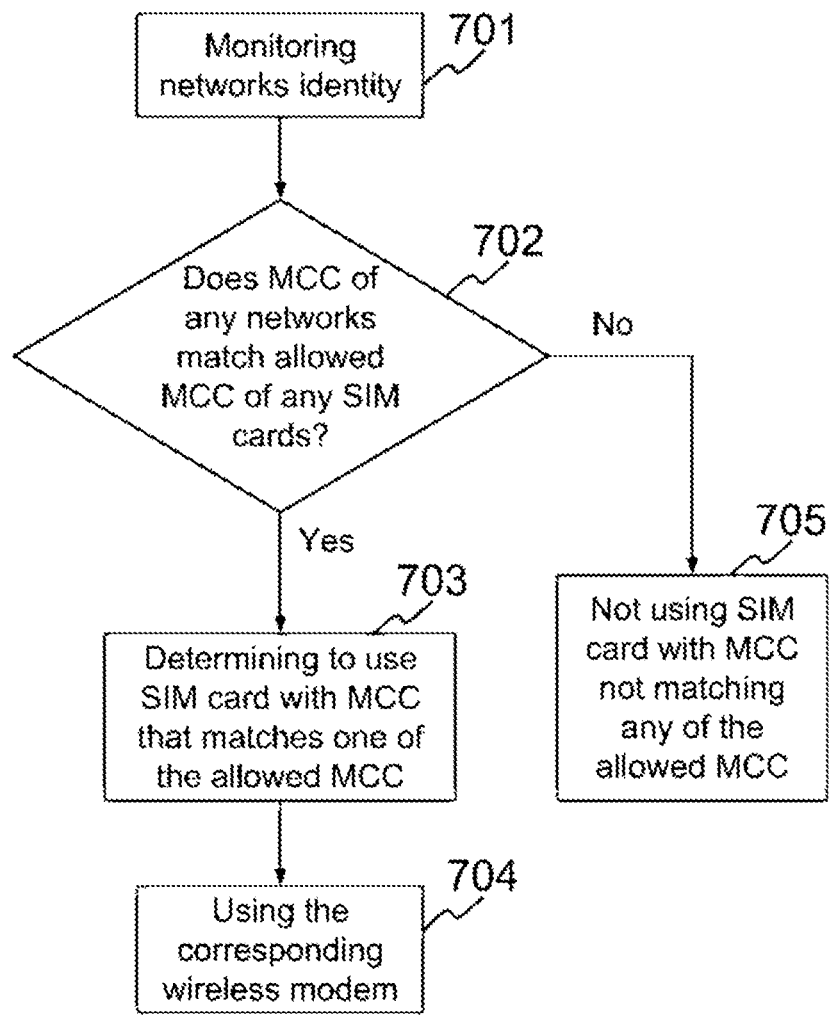
FIG. 7 is a flowchart illustrating a process according to one of the embodiments of the present invention.

The invention claimed is:

1. A method for selecting at least two SIM cards at a wireless communication device, wherein the wireless communication device is configured to house a plurality of SIM cards, the method comprising:
    using the at least two SIM cards simultaneously to establish a plurality of connections;
    determining whether a switching condition is satisfied; and
    when the switching condition is satisfied:
        (a) selecting a substitute SIM card from the plurality of SIM cards based on at least one factor;
        (b) disconnecting a corresponding connection established by one of the at least two SIM cards, wherein the corresponding connection is in the plurality of connections;
        (c) determining whether the substitute SIM card is capable of transmitting and receiving data;
        (d) using the substitute SIM card to establish a substitute connection after the substitute SIM card is determined to be capable of transmitting and receiving data;
        (e) repeating steps (a) to (d) until (i) the switching condition is no longer satisfied or (ii) no SIM card is selected based on the at least one factor;
    wherein the plurality of SIM cards is classified into a plurality of groups according to the at least one factor; and
    wherein the at least two SIM cards are from two different groups in the plurality of groups.

2. The method of claim 1, wherein the switching condition is selected from a group consisting of performance, maximizing the number of networks, service provider, a usage limit, a geographical location, time, a user identity, and a communication technology.

3. The method of claim 2, wherein the switching condition is the geographical location and the geographical location is determined using a global positioning system (GPS) sensor, based on signal strengths of networks, or a network identity.

4. The method of claim 3, wherein:
    the network identity is determined based on a mobile country code (MCC) and a mobile network code (MNC) of a network; and
    the network is associated with each of the plurality of SIM cards.

5. The method of claim 1, further comprising, when the substitute SIM card is determined to not be capable of transmitting and receiving data at step (c), either starting using of the corresponding connection disconnected at step (b) or waiting, wherein:
 the wireless communication device is configured to simultaneously use the plurality of connections and the substitute connection for transmitting and receiving data; and
 the at least two SIM cards are connected to at least two different networks.

6. The method of claim 1, wherein the plurality of connections and the substitute connection are bonded to form an aggregated end-to-end connection.

7. The method of claim 1, wherein:
 the wireless communication device comprises a plurality of wireless modems and at least one wireless modem is used for monitoring signal strength of available networks; and
 the available networks are associated with remaining SIM cards of the plurality of SIM cards.

8. The method of claim 1, wherein:
 the wireless communication device comprises a plurality of wireless modems and a plurality of selectors connected to the plurality of SIM cards; and
 each of the plurality of selectors is configured to select at least two SIM cards.

9. The method of claim 1, further comprising connecting to a new network when the wireless communication device is capable of connecting to the new network and the switching condition is to maximize the number of networks connected, wherein the new network is associated with a remaining SIM card in the plurality of SIM cards.

10. The method of claim 1, wherein the at least one factor is selected from a group consisting of a geographical coverage area, a connection bandwidth, time, a usage price, a usage limit, and a signal quality.

11. A wireless communication device for selecting at least two SIM cards, wherein the wireless communication device is configured to house a plurality of SIM cards, comprising:
 a plurality of wireless modems;
 a plurality of network interfaces;
 at least one main memory;
 at least one processing unit; and
 at least one non-transitory computer-readable storage medium storing program instructions executable by the at least one processing unit and configured to cause the at least one processing unit to perform the following steps:
  using the at least two SIM cards simultaneously to establish a plurality of connections;
  determining whether a switching condition is satisfied; and
  when the switching condition is satisfied:
   (a) selecting a substitute SIM card from the plurality of SIM cards based on at least one factor;
   (b) disconnecting a corresponding connection established by one of the at least two SIM cards, wherein the corresponding connection is in the plurality of connections;
   (c) determining whether the substitute SIM card is capable of transmitting and receiving data;
   (d) using the substitute SIM card to establish a substitute connection after the substitute SIM card is determined to be capable of transmitting and receiving data;
   (e) repeating steps (a) to (d) until (i) the switching condition is no longer satisfied or (ii) no SIM card is selected based on the at least one factor;
  wherein the plurality of SIM cards is classified into a plurality of groups according to the at least one factor; and
  wherein the at least two SIM cards are from two different groups in the plurality of groups.

12. The wireless communication device of claim 11, wherein the switching condition is selected from a group consisting of performance, maximizing the number of networks, a service provider, a usage limit, a geographical location, time, a user identity, and a communication technology.

13. The wireless communication device of claim 12, wherein the switching condition is the geographical location and the geographical location is determined using a global positioning system (GPS) sensor, based on signal strengths of networks, or a network identity.

14. The wireless communication device of claim 13, wherein:
 the program instructions executable by the at least one processing unit are configured to cause the at least one processing unit to determine the network identity based on a mobile country code (MCC) and a mobile network code (MNC) of a network; and
 the network is associated with each of the plurality of SIM cards.

15. The wireless communication device of claim 11, wherein:
 the program instructions executable by the at least one processing unit are configured to cause the at least one processing unit, when the substitute SIM card is determined to not be capable of transmitting and receiving data at step (c), either to start using the corresponding connection disconnected at step (b) or to wait;
 the wireless communication device is configured to simultaneously use the plurality of connections and the substitute connection for transmitting and receiving data; and
 the at least two SIM cards are connected to at least two different networks.

16. The wireless communication device of claim 11, wherein the plurality of connections and the substitute connection are bonded to form an aggregated end-to-end connection.

17. The wireless communication device of claim 11, wherein:
 at least one wireless modem is used for monitoring signal strength of available networks; and
 the available networks are associated with remaining SIM cards of the plurality of SIM cards.

18. The wireless communication device of claim 11, wherein:
 the wireless communication device further comprises a plurality of selectors connected to the plurality of SIM cards through the plurality of wireless modems; and
 each of the plurality of selectors is configured to select at least two SIM cards.

19. The wireless communication device of claim 11, wherein:
 the program instructions executable by the at least one processing unit are configured to cause the at least one processing unit to connect the wireless communication device to a new network when the wireless communication device is capable of connecting to the new network and the switching condition is to maximize the number of networks connected; and
 the new network is associated with a remaining SIM card in the plurality of SIM cards.

20. The wireless communication device of claim 11, wherein the at least one factor is selected from a group consisting of a geographical coverage area, a connection bandwidth, time, a usage price, a usage limit, and a signal quality.

* * * * *